United States Patent [19]
Saka et al.

[11] Patent Number: 5,778,528
[45] Date of Patent: Jul. 14, 1998

[54] WIRING CONSTRUCTION OF ELECTRICAL CONNECTION BOX

[75] Inventors: Yuuji Saka; Takahiro Onizuka; Yoshito Oka; Makoto Kobayashi; Nori Inoue, all of Yokkaichi, Japan

[73] Assignee: Sumitomo Wiring Systems, Ltd., Yokkaichi, Japan

[21] Appl. No.: 724,755

[22] Filed: Oct. 3, 1996

Related U.S. Application Data

[62] Division of Ser. No. 512,831, Aug. 9, 1995.

[30] Foreign Application Priority Data

| Aug. 23, 1994 | [JP] | Japan | 6-198547 |
| Aug. 23, 1994 | [JP] | Japan | 6-198548 |
| Aug. 31, 1994 | [JP] | Japan | 6-207510 |
| Sep. 1, 1994 | [JP] | Japan | 6-208838 |
| Sep. 5, 1994 | [JP] | Japan | 6-211314 |
| Sep. 14, 1994 | [JP] | Japan | 6-220604 |

[51] Int. Cl.$^6$ ................................................. H01K 3/10
[52] U.S. Cl. ................................................. 29/850
[58] Field of Search ........................... 439/392, 402, 439/404, 405, 408, 76.2, 722; 29/850, 592.1, 755, 872, 861, 863, 865, 866

[56] References Cited

U.S. PATENT DOCUMENTS

| 4,169,645 | 10/1979 | Faulconer | 439/392 |
| 4,192,570 | 3/1980 | Van Horn | 439/402 |
| 4,284,316 | 8/1981 | Debaigt | 439/392 |
| 4,387,509 | 6/1983 | Dechelette | 29/850 |
| 4,674,819 | 6/1987 | Fujitani et al. | 439/404 |
| 4,679,881 | 7/1987 | Galvin et al. | 439/392 |
| 4,684,765 | 8/1987 | Beck et al. | 439/76.2 |
| 4,725,247 | 2/1988 | Fremgen | 439/392 |
| 4,781,618 | 11/1988 | Geib et al. | 439/392 |
| 4,897,042 | 1/1990 | Saka et al. | 439/404 |
| 4,938,719 | 7/1990 | Sawai et al. | 439/404 |
| 5,156,557 | 10/1992 | Okafuji et al. | 439/404 |
| 5,207,587 | 5/1993 | Hamill et al. | 439/76 |
| 5,412,861 | 5/1995 | Fudoo et al. | 29/850 |

FOREIGN PATENT DOCUMENTS

| 3843664 | 7/1989 | Germany. |
| 5300627 | 11/1993 | Japan. |
| 6164281 | 7/1995 | Japan. |

*Primary Examiner*—Neil Abrams
*Assistant Examiner*—Brian J. Biggi
*Attorney, Agent, or Firm*—Greenblum & Bernstein P.L.C.

[57] ABSTRACT

A wiring construction of an electrical connection box which has an internal circuit including a wire and a plurality of pressing contact terminals connected to the wire and in which an insulating plate is accommodated in a casing, the wiring construction comprising: a plurality of wiring grooves for receiving the wire or a plurality of pairs of wiring projections for guiding the wire therebetween, which are provided on at least one of opposite faces of the insulating plate such that predetermined portions of the wiring grooves or the wiring projections extend to an outer peripheral edge of the insulating plate; wherein a nonconnective portion of the wire is disposed at the outer peripheral edge of the insulating plate by cutting from the wire a portion of the wire projecting out of the outer peripheral edge of the insulating plate.

1 Claim, 19 Drawing Sheets

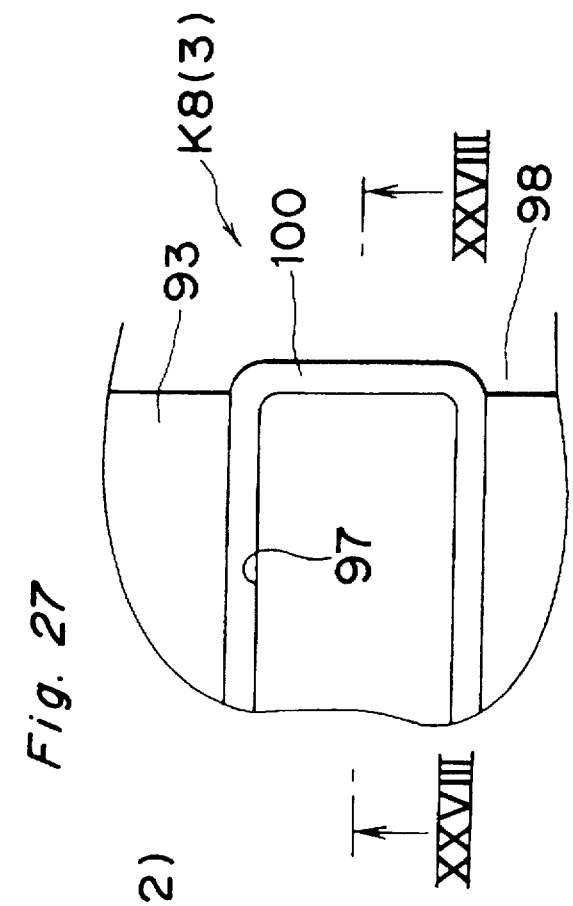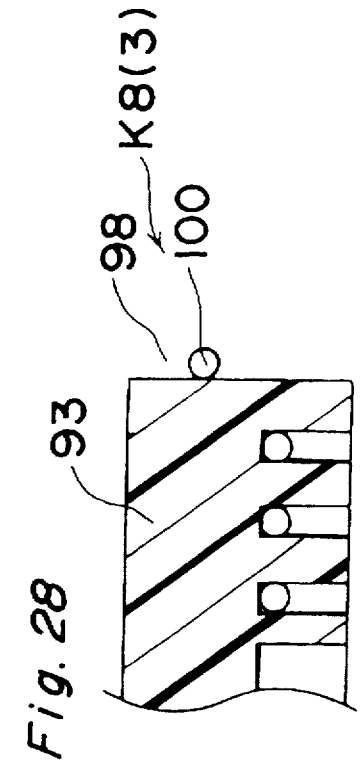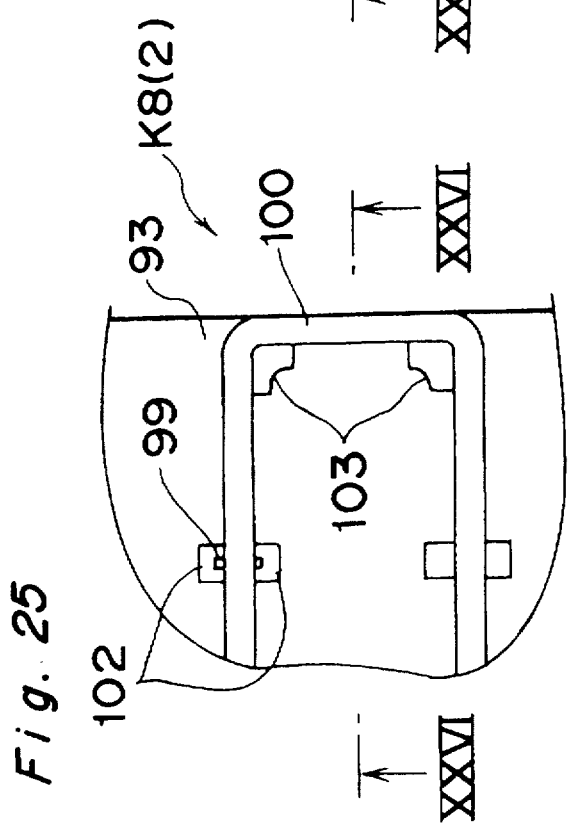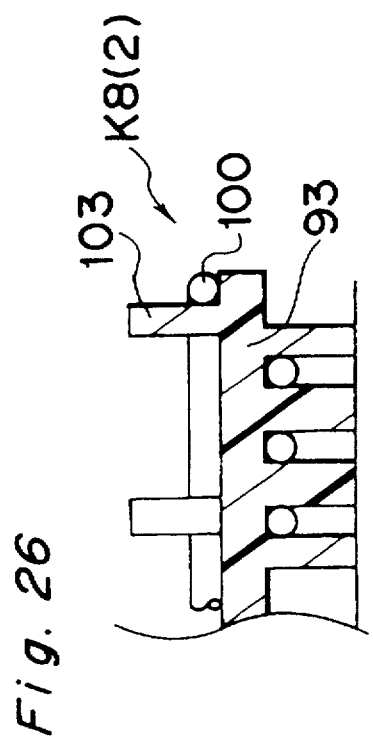

WIRING CONSTRUCTION OF ELECTRICAL CONNECTION BOX

This application is a division of application Ser. No. 08/512,831, filed Aug. 9, 1995, pending.

BACKGROUND OF THE INVENTION

The present invention generally relates to an electrical connection box to be connected to wiring harnesses for a motor vehicle and more particularly, to a wiring construction and a wiring method for reducing area required for wiring in an electrical connection box in which an internal circuit for concentrated branching and connection is partially or wholly constituted by wires and pressing contact terminals brought into pressing contact with the wires.

Conventionally, in case wires and pressing contact terminals are used as an internal circuit for an electrical connection box, the pressing contact terminals are usually mounted on an upper casing, a lower casing or is an insulating plate of the electrical connection box preliminarily and then, the wires laid along a predetermined wiring pattern on a wiring die provided separately are transferred to the casing or the insulating plate and are connected to the pressing contact terminals so as to be laid in the electrical connection box.

When the wires laid on the wiring die are transferred to the casing or the insulating plate, a single wire is laid continuously on the wiring die. Subsequently, the wire is transferred to the casing or the insulating plate and connected to the pressing contact terminals. Thereafter, in order to separate circuit sections of the internal circuit from each other, unnecessary portions of the wire, which should act as nonconnective portions, are cut from the wire. If the single wire is continuously laid on the wiring die as described above, such an advantage can be obtained that supply and stop of supply of the wire are not required to be performed intermittently, thereby resulting in rise of working efficiency.

However, in the above mentioned known method in which after a wire 2 has been continuously laid on the wiring die, an unnecessary portion 2a of the wire 2 is cut from the wire 2 as shown in FIG. 1, a hatched area S required for laying the unnecessary portion 2a becomes unnecessary finally. Accordingly, necessary area of the insulating plate is increased by this additional area S. In other words, as the unnecessary portion 2a of the wire 2 becomes longer, useless space on the insulating plate is increased further. As a result, it is impossible to lay the wires on the insulating plate at high density and the insulating plate, i.e., the electrical connection box cannot be made compact greatly.

Meanwhile, in case the internal circuit of the electrical connection box is constituted by the wires and the pressing contact terminals, the following advantages can be gained over a case in which bus bars formed by blanking electrically conductive metal plates are used as the internal circuit. Namely, it is possible to easily cope with design changes of the internal circuit and production cost of the internal circuit can be lowered by eliminating the need for a die for blanking the bus bars.

However, in case the internal circuit includes the wires, the wires are laid along the predetermined wiring pattern on an identical plane of the casing or the insulating plate, grooves or projecting guides are usually provided for a single wire and thus, the wiring pattern is complicated. Therefore, if the wire to be laid becomes long, area of the insulating plate or the casing should be increased. Therefore, in case there is a limit to size of the insulating plate or the casing, it is impossible to lay the wires in the electrical connection box at high density. On the other hand, if there is no limit to size of the insulating plate or the casing, the number of circuit sections to be formed can be increased by increasing amount of the wires to be laid. In this case, such a drawback is incurred that area of the insulating plate or the casing is increased, thereby resulting in increase of size of the electrical connection box.

Furthermore, if the wiring pattern changes, different wiring dies should be produced additionally in accordance with the wiring patterns, respectively. Meanwhile, after the wire has been laid on the wiring die, the wire is required to be transferred to the casing or the insulating plate, so that the number of operational steps increases. As a result, production cost of the electrical connection box rises. Hence, in order to solve this problem, the present applicant proposed the following wiring construction in Japanese Patent Application No. 6-164281 (1994). Namely, as shown in FIG. 2, wiring grooves 3 are formed on the insulating plate 1 and the wires 2 are inserted into the wiring grooves 3. Subsequently, pressing contact terminals 4 are press fitted into terminal driving portions 5 formed on the insulating plate 1 so as to be electrically connected to the wires 3. However, if a plurality of the wires 2 are laid in the wiring grooves 3, a plurality of the wiring grooves 3 are required to be provided for the wires 2, respectively. Meanwhile, the wiring grooves 3 are arranged to enable insertion of the pressing contact terminals 4 thereinto by positioning the wires 2 relative to the insulating plate 1. Therefore, at locations of the insulating plate 1 where the pressing contact terminals 4 are not press fitted, the wires 2 extending side by side are not necessarily required to be separated from each other by the wiring grooves 3 and thus, size of the insulating plate 1 is increased by forming the wiring grooves 3.

FIG. 3 shows an example of a prior art electrical connection box. In this prior art electrical connection box, a wire 15 disposed in a casing 14 formed by an upper casing 12 and a lower casing 13 is connected to a pressing contact portion 11a of a pressing contact terminal 11 and an input-output terminal portion 11b of the pressing contact terminal 11 is projected from a terminal hole 12a into a connector portion 12b.

In case the prior art electrical connection box of FIG. 3 is assembled, the pressing contact terminal 11 is driven into the upper casing 12 and then, the wire 15 is brought into pressing contact with the pressing contact portion 11a of the pressing contact terminal 11. At this time, since another pressing contact terminal 11 obstructs pressing contact of the wire 15 with the pressing contact portion 11a, it is troublesome to lay the wire 11 along the predetermined wiring pattern, thus resulting in poor wiring efficiency. Meanwhile, in the prior art electrical connection box, since wiring also becomes complicated when the internal circuit is complicated, an automatic apparatus should be used for wiring, thereby resulting in rise of its production cost. Furthermore, if the electrical connection box is used for a motor vehicle, an optional circuit may be required to be provided according to grade of the motor vehicle. Alternatively, when the internal circuit is used for motor vehicles of different types in common, a circuit section of the internal circuit, which is not used for the motor vehicles in common, should be set to an optional circuit. In this case, in the above described known arrangement in which the pressing contact terminal 11 is driven into the upper casing 12, wiring becomes further complicated.

SUMMARY OF THE INVENTION

Accordingly, an essential object of the present invention is to provide, with a view to eliminating the above described inconveniences inherent in wiring constructions of conventional electrical connection boxes, a wiring construction and a wiring method of an electrical connection box, in which useless space produced on an insulating plate by continuous wiring is eliminated and effective wiring area of the insulating plate is increased such that not only wiring can be performed at high density but the electrical connection box can be made compact in response to recent trend for increase of space for a cabin.

Another important object of the present invention is to provide a wiring construction and a wiring method of an electrical connection box, in which wiring can be performed easily.

In order to accomplish these objects of the present invention, a wiring construction of an electrical Connection box which has an internal circuit including a wire and a plurality of pressing contact terminals connected to the wire and in which an insulating plate is accommodated in a casing, according to one embodiment of the present invention comprises: a plurality of wiring grooves for receiving the wire or a plurality of pairs of wiring projections for guiding the wire therebetween, which are provided on at least one of opposite faces of the insulating plate such that predetermined portions of the wiring grooves or the wiring projections extend to an outer peripheral edge of the insulating plate; wherein a nonconnective portion of the wire is disposed at the outer peripheral edge of the insulating plate by cutting from the wire a portion of the wire projecting out of the outer peripheral edge of the insulating plate.

In this wiring construction, the wire is continuously laid along the wiring grooves or the wiring projections on the insulating plate directly. At the portion of the wiring grooves or the wiring projections extending to the outer peripheral edge of the insulating plate, the wire is drawn outwardly from the outer peripheral edge of the insulating plate so as to be laid continuously. After the pressing contact terminals have been driven into the terminal driving portions so as to be connected to the wire laid on the insulating plate or before the pressing contact terminals are driven into the terminal driving portions, the portion of the wire drawn out of the outer peripheral edge of the insulating plate is cut from the wire such that the circuit is separated into circuit sections. At this time, predetermined locations of the wire disposed inside the insulating plate are also cut such that the circuit sections are separated from each other.

Since the portion of the wire to be cut from the wire in the subsequent step is drawn out of the insulating plate preliminarily, space for laying this unnecessary portion of the wire is not required to be provided on the insulating plate.

The wiring grooves recessed from the face of the insulating plate have a depth twice a diameter of the wire or more and the wire having predetermined rigidity is directly inserted into the wiring grooves so as to be held in the wiring grooves. Furthermore, terminal driving portions are formed at predetermined locations of the wiring grooves. Thus, after the wire has been inserted into the wiring grooves so as to be laid along the wiring grooves, the pressing contact terminals are, respectively, driven into the terminal driving portions so as to be connected to the wire through pressing contact. Then, by assembling upper and lower casings with the insulating plate having the wire and the pressing contact terminals connected to the wire, the electrical connection box is obtained.

Meanwhile, each pair of the wiring projections projecting from the face of the insulating plate are formed by a pair of bosses disposed at opposite sides of the wire The wiring projections provided at predetermined locations on the face of the insulating plate have a height twice the diameter of the wire or more and the wire having predetermined rigidity is directly inserted in between the wiring projections so as to be held between the wiring projections. Moreover, the terminal driving portions are formed on opposed inner surfaces of each pair of the wiring projections at predetermined locations of the wiring projections. Hence, after the wire has been inserted in between the wiring projections so as to be laid along the wiring projections, the pressing contact terminals are, respectively, driven into the terminal driving portions so as to be connected to the wire through pressing contact. Then, by assembling the upper and lower casings with the insulating plate having the wire and the pressing contact terminals connected to the wire, the electrical connection box is obtained in the same manner as the wiring grooves.

Width of the wiring grooves or distance between each pair of the wiring projections is set such that a large-diameter wire and a small-diameter wire can be inserted into the wiring grooves or in between the wiring projections at a power circuit and a load circuit, respectively. Meanwhile, in place of the insulating plate, the wiring grooves or the wiring projections may be provided on an inner face of the casing according to shapes of the upper and lower casings such that the pressing contact terminals are connected to the wire laid directly on the casing.

Meanwhile, the present invention provides also a wiring method of an electrical connection box in which a plurality of wiring grooves for receiving a single continuous wire or a plurality of pairs of wiring projections for guiding the wire therebetween are provided on at least one of opposite faces of an insulating plate accommodated in a casing, the wiring method comprising the steps of: continuously laying the wire along the wiring grooves or the wiring projections so as to draw an unnecessary portion of the wire out of an outer peripheral edge of the insulating plate; connecting a plurality of pressing contact terminals to the wire so as to form an internal circuit of the electrical connection box; and cutting the unnecessary portion of the wire from the wire so as to dispose a nonconnective portion of the wire at the outer peripheral edge of the insulating plate.

In this wiring method, since the single wire is laid continuously, wiring can be performed efficiently. Meanwhile, since the unnecessary portion of the wire drawn out of the insulating plate may be cut from the wire simultaneously with or successively to cutting of the predetermined locations of the wire disposed inside the insulating plate, a step of cutting the unnecessary portion of the wire from the wire is not required to be provided additionally and thus, the number of operational steps is not increased.

BRIEF DESCRIPTION OF THE DRAWINGS

These objects and features of the present invention will become apparent from the following description taken in conjunction with preferred embodiments thereof with reference to the accompanying drawings, in which:

FIG. 25 is a fragmentary top plan view of an insulating plate of an electrical connection box having a wiring construction which is a second modification of the wiring construction of FIG. 19;

FIG. 26 is a sectional view taken along the line XXVI—XXVI in FIG. 25;

FIG. 27 is a fragmentary top plan view of an insulating plate of an electrical connection box having a wiring construction which is a third modification of the wiring construction of FIG. 19;

FIGS. 28 is a sectional view taken along the line XXVIII—XXVIII in FIG. 27;

Before the description of the present invention proceeds, it is to be noted that like parts are designated by like reference numerals throughout several views of the accompanying drawings.

DETAILED DESCRIPTION OF THE INVENTION

Figure 1:
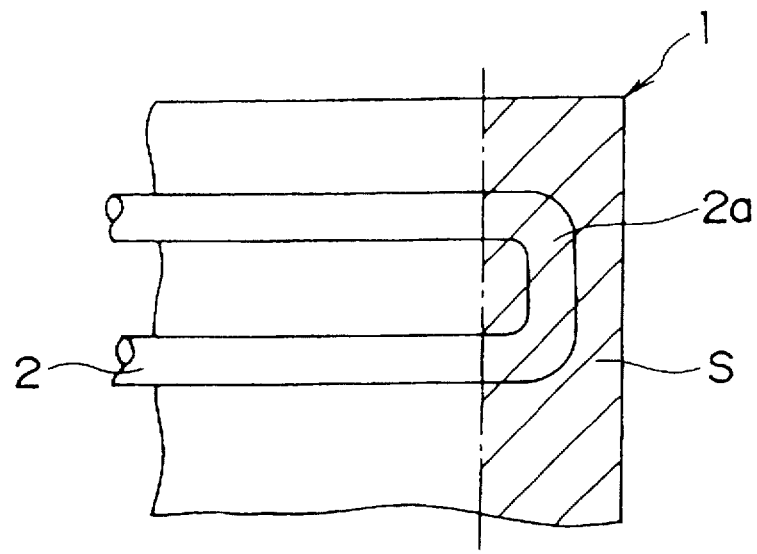
FIG. 1 is a fragmentary top plan view of an insulating plate of a prior art electrical connection box (already referred to)
Figure 2:
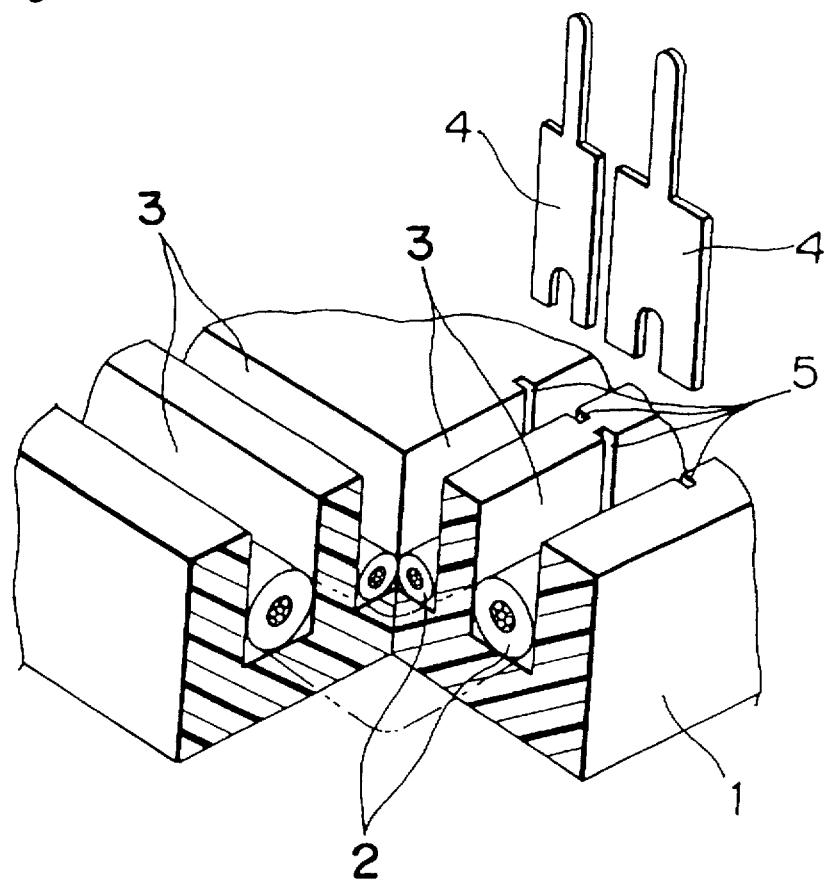
FIG. 2 is an enlarged fragmentary broken perspective view of an insulating plate of another electrical connection box (already referred to)
Figure 3:
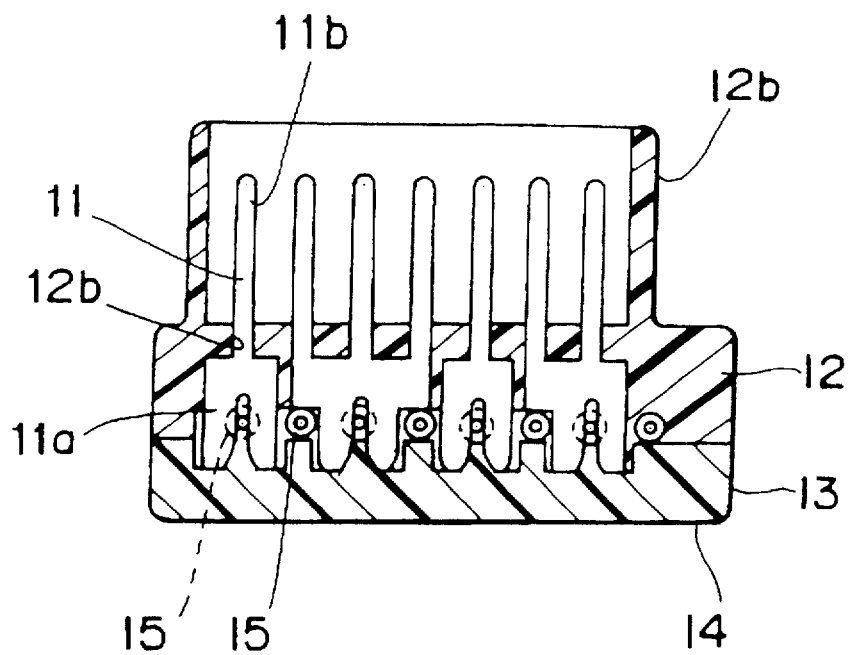
FIG. 3 is a sectional view of still another electrical connection box (already referred to)
Figure 4:
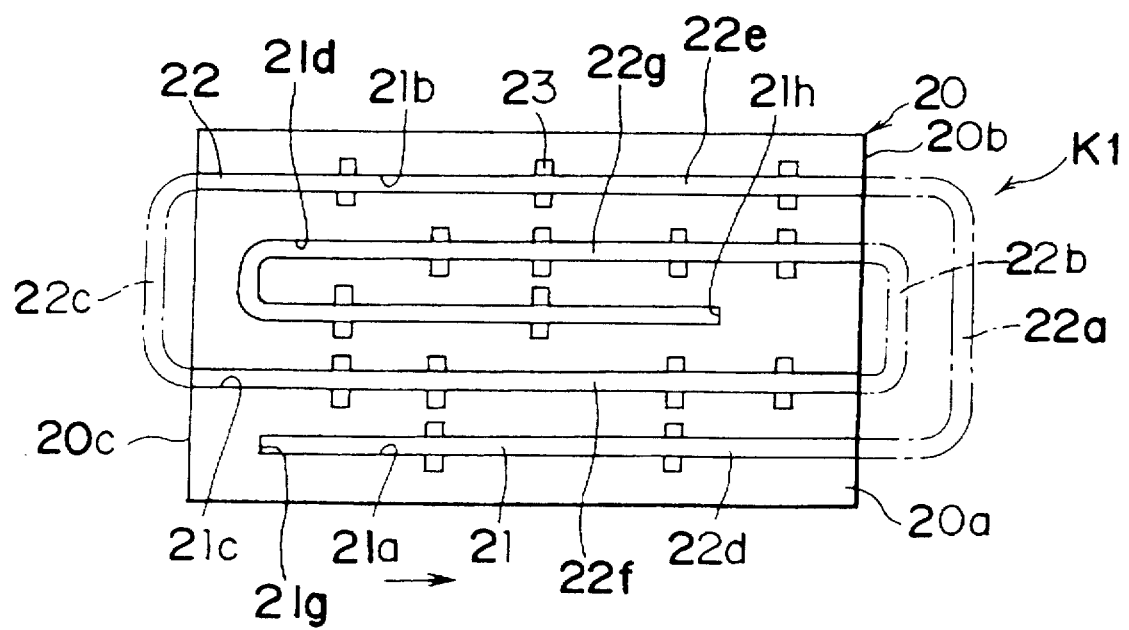
FIG. 4 is a top plan view of an insulating plate of an electrical connection box having a wiring construction according to a first embodiment in one aspect of the present invention.
Figure 5:
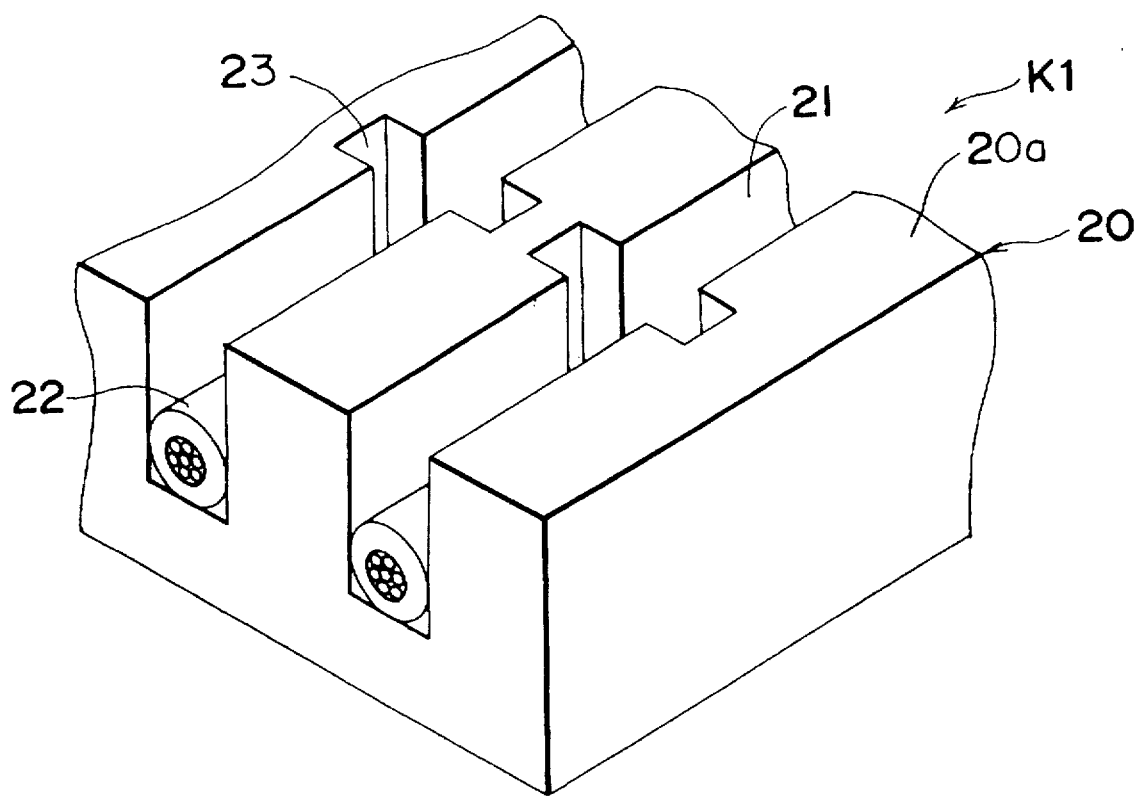
FIG. 5 is an enlarged fragmentary perspective view of the insulating plate of FIG. 4.
Figure 6:
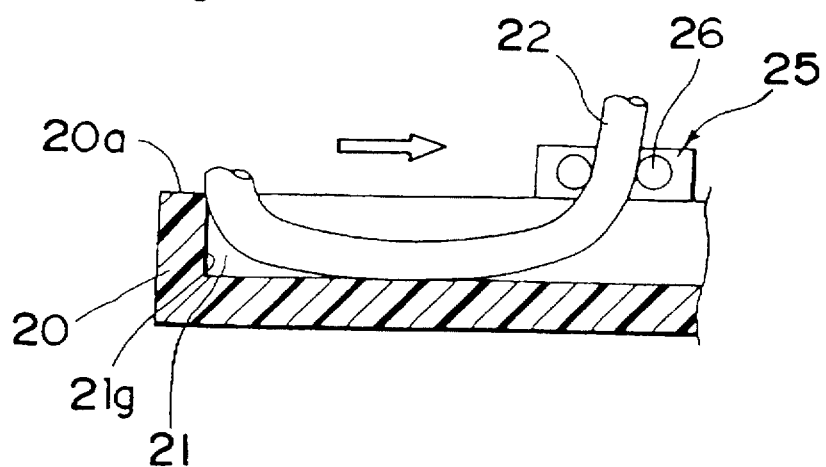
FIG. 6 is a schematic sectional view showing a wiring method according to one embodiment in another aspect of the present invention.
Figure 7:
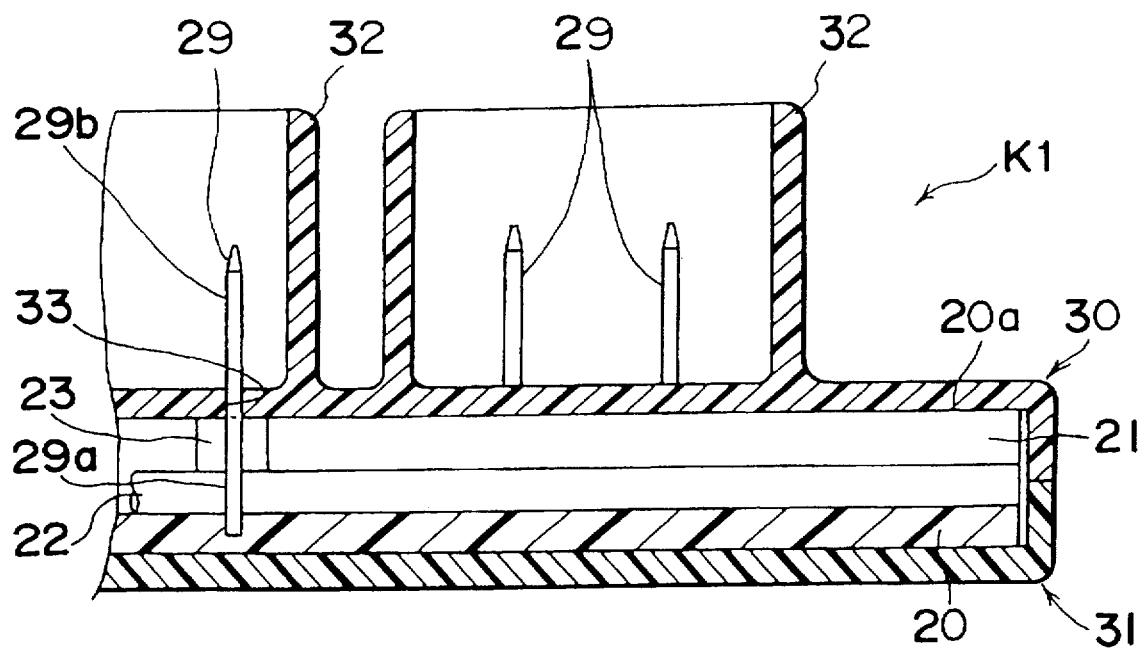
FIG. 7 is a fragmentary sectional view of the electrical connection box of FIG. 4.

Referring now to the drawings, there is shown in FIGS. 4 and 5, an insulating plate 20 of an electrical connection box of FIG. 7 having a wiring construction K1 according to a first embodiment in one aspect of the present invention. FIG. 6 shows a wiring method of the electrical connection box of FIG. 7 according to one embodiment in another aspect of the present invention. In the wiring construction K1, a wiring groove 21 is formed along a wiring pattern on an upper face 20a of the insulating plate 20 so as to have a depth twice a diameter of a wire 22 to be inserted into the wiring groove 21. Meanwhile, at predetermined locations of the wiring groove 21, opposed faces of the wiring groove 21 are recessed so as to form, by widening the wiring groove 21, terminal driving portions 23 for driving pressing contact terminals 29 thereinto, respectively.

The wiring pattern is designed such that unnecessary portions 22a, 22b and 22c of the wire 22, which are cut from the wire 22 after its continuous wiring, are disposed at opposite ends 20b and 20c of the insulating plate 20 as much as possible. Thus, as shown in FIG. 4, the unnecessary portions 22a to 22c of the wire 22 are drawn out of the opposite ends 20b and 20c of the insulating plate 20. Circuit portions 22d and 22e of the wire 22, which extend from opposite ends of the unnecessary portion 22a, respectively and are separated from each other by cutting the unnecessary portion 22a from the wire 22, are inserted into the wiring grooves 21a and 21b, respectively and the wiring grooves 21a and 21b open to the end 20b of the insulating plate 20. Likewise, circuit portions 22f and 22g of the wire 22, which extend from opposite ends of the unnecessary portion 22b, respectively and are separated from each other by cutting the unnecessary portion 22b from the wire 22, are inserted into the wiring grooves 21c and 21d, respectively and the wiring grooves 21c and 21d open to the end 20b of the insulating plate 20. Meanwhile, circuit portions 22f and 22e of the wire 22, which extend from opposite ends of the unnecessary portion 22c, respectively and are separated from each other by cutting the unnecessary portion 22c from the wire 22, are inserted into the wiring grooves 21c and 21b, respectively and the wiring grooves 21c and 21b open to the end 20c of the insulating plate 20.

As shown in FIG. 6, the wire 22 is inserted into the wiring groove 21 by a pair of feed rollers 26 of a wire feeder 25 so as to be laid on the insulating plate 20. At this time, the wire 22 is laid in the wiring groove 21 continuously from one end 21g of the wiring groove 21 to the other end 21h of the wiring groove 21 as shown by the arrows in FIGS. 4 and 6. For the unnecessary portions 22a, 22b and 22c which are cut from the wire 22 after wiring, the wiring groove 21 extends to the opposite ends 20b and 20c of the insulating plate 20 and thus, the wire 22 is laid in the wiring groove 21 up to the ends 20b and 20c of the insulating plate 20 and then, is drawn out of the opposite ends 20b and 20c of the insulating plate 20 so as to be laid in the wiring groove 21 continuously. For example, for the unnecessary portion 22a, the wire 22 is laid in the wiring groove 21a up to the end 20b of the insulating plate 20 and then, is drawn out of the end 20b of the insulating plate 20 so as to be inserted into the wiring groove 21b from the end 20b of the insulating plate 20.

After the wire 22 has been continuously laid in the wiring groove 21 of the insulating plate 20 as described above, the pressing contact terminals 29 are driven into terminal driving portions 23, so that an edge of a slot of a pressing contact portion 29a of each of the pressing contact terminals 29 is thrust into an insulating coating of the wire 22 held in the wiring groove 21 such that each of the pressing contact terminals 19 is connected to a conductor of the wire 22 through pressing contact. Subsequently, the unnecessary portions 22a, 22b and 22c of the wire 22, which are drawn out of the opposite ends 20b and 20c of the insulating plate 20, are cut from the wire 22. At the same time or subsequently, predetermined locations of the wire 22, which are disposed inside the insulating plate 20, are also cut so as to divide the wire 22 into a plurality of independent circuit portions.

After the wire 22 and the pressing contact terminals 29 have been mounted on the insulating plate 20 as described above, an upper casing 30 and a lower casing 31 are assembled with the insulating plate 20 as shown in FIG. 7 such that the electrical connection box is obtained. At this time, a terminal portion 29b extending from the pressing contact portion 29a of the pressing contact terminal 29 is projected out of each of terminal holes 33 formed on a bottom wall of a connector portion 32 provided on an outer surface of the upper casing 30 so as to be directly connected to a connector (not shown) fitted into the connector portion 32.

Meanwhile, it may also be so arranged that a portion of the wiring groove 21 is formed as wiring grooves for receiving large-diameter wires and terminal portions of pressing contact terminals connected to the large-diameter wires are projected out of terminal holes of a fuse fitting portion or a relay fitting portion provided on the casing so as to be connected to fuses or relays such that the large-diameter wires are connected to a power source.

Furthermore, in the first embodiment, the wiring groove 21 is formed on only the upper face 20a of the insulating plate 20 but may also be formed on only a lower face of the insulating plate 20. Alternatively, needless to say, it may also be so arranged that the wiring grooves 21 are formed on both the upper and lower faces of the insulating plate 20 and the terminal portions of the pressing contact terminals connected to the wires held in the wiring grooves are projected out of opposite faces of the upper and lower casings so as to connected to the connectors, fuses, relays, etc.

Figure 8:
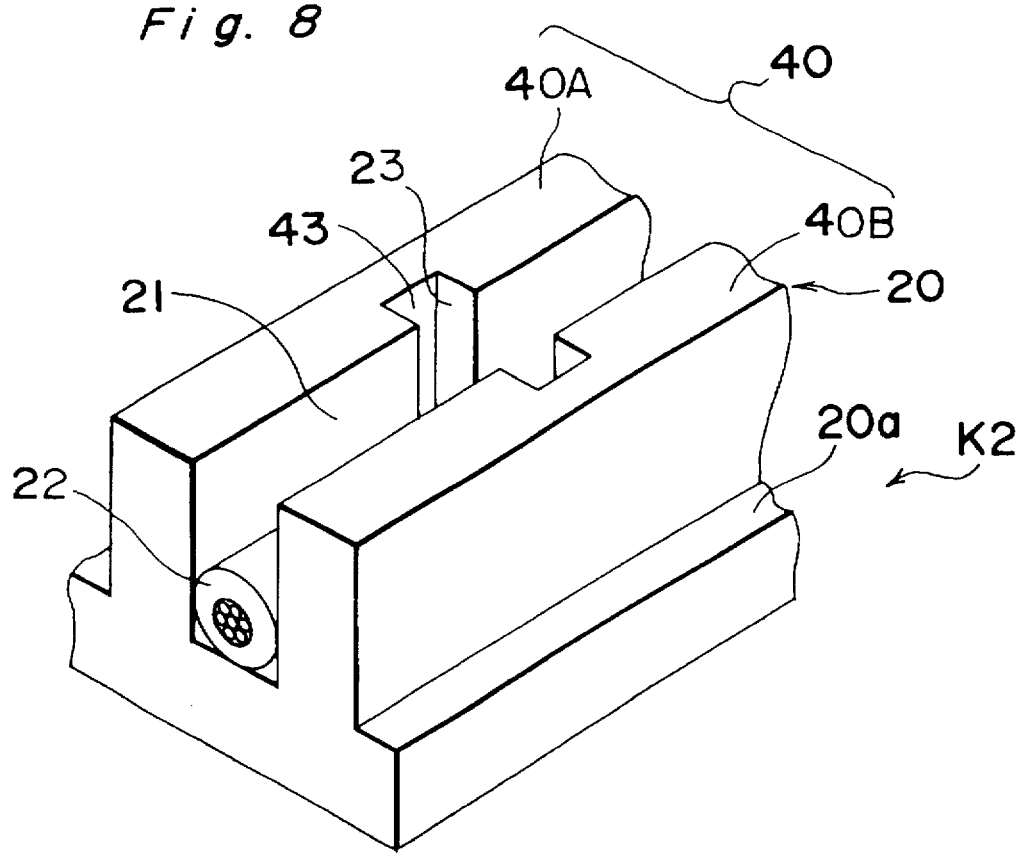
FIG. 8 is an enlarged fragmentary perspective view of an insulating plate of an electrical connection box having a wiring construction according to a second embodiment in one aspect of the present invention.

FIG. 8 shows the insulating plate 20 of an electrical connection box having a wiring construction K2 according to a second embodiment of the present invention. In the first embodiment, thickness of the insulating plate 20 is made large and the wiring groove 21 is formed on the insulating plate 20 in accordance with the wiring pattern. In the second embodiment, thickness of the insulating plate 20 is made small and a plurality of pairs of wiring projections 40 (40A and 40B) for guiding the wire 22 are provided at predetermined locations on the upper face 20a and/or the lower face of the insulating plate 20 along a wiring pattern. In FIG. 8, the wiring projections 40 are formed on only the upper face 20a of the insulating plate 20. Each pair of the wiring projections 40 confronting each other are spaced from each other a distance substantially equal to the diameter of the wire 22 and has a height about twice the diameter of the wire 22.

The wiring projections 40 are not required to be provided throughout the wiring pattern but are provided in such a number that the wire 22 can be laid along the wiring pattern. Therefore, for example, the wiring projections 40 are provided at opposite ends of the wiring pattern for continuous wiring, locations for driving the pressing contact terminals and opposite ends of a bent portion of the wiring pattern. Instead of providing the wiring projections 40 at the opposite ends of the bent portion of the wiring pattern, a pair of a substantially L-shaped wiring projections may also be provided.

At locations of the insulating plate 20 corresponding to the unnecessary portions 22a to 22c of the wire 22, the wiring projections 40 also extend to the opposite ends 20b and 20c of the insulating plate 20 in the same manner as the wiring groove 21 of the first embodiment and thus, the wire 22 is drawn out of the opposite ends 20b and 20c of the insulating plate 20 so as to be laid continuously. A pair of recesses 43 acting as the terminal driving portion 23 of the first embodiment are, respectively, formed at a predetermined location on opposed faces of each pair of the wiring projections 40.

In the second embodiment, laying of the wire 22 between the wiring projections 40, connection of the wire 22 to the pressing contact terminals, cutting of the unnecessary portions from the wire 22 and assembly of the upper and lower casings are performed in the same manner as the first embodiment and therefore, the description is abbreviated.

In the above described wiring construction of the first and second embodiments of the present invention, since the wire is laid on the insulating plate such that the unnecessary portions to be cut from the wire are drawn out of the insulating plate in advance, area of the insulating plate required for laying the unnecessary portions of the wire can be eliminated and thus, the insulating plate can be made compact. Therefore, in case size of the insulating plate is fixed, it is possible to lay the wire at high density. Meanwhile, in case amount of the wires to be laid is fixed, the electrical connection box can be made compact by reducing size of the insulating plate.

Meanwhile, in the above mentioned wiring method of the present invention, since wiring is performed continuously by using the single wire, wiring can be performed highly efficiently. Meanwhile, if the unnecessary portions of the wire are cut from the wire simultaneously with or subsequently to cutting of predetermined locations of the wire 22, a cutting step for cutting the unnecessary portions from the wire is not required to be provided additionally and thus, increase of the number of operational steps can be prevented. Furthermore, in comparison with a known wiring method in which the wire laid on a wiring die is transferred to the casing or the insulating plate, the wire can be laid directly on the insulating plate without using the wiring die, so that not only the number of operational steps of the wiring method can be reduced but the need for the wiring die can be eliminated.

Figure 9:
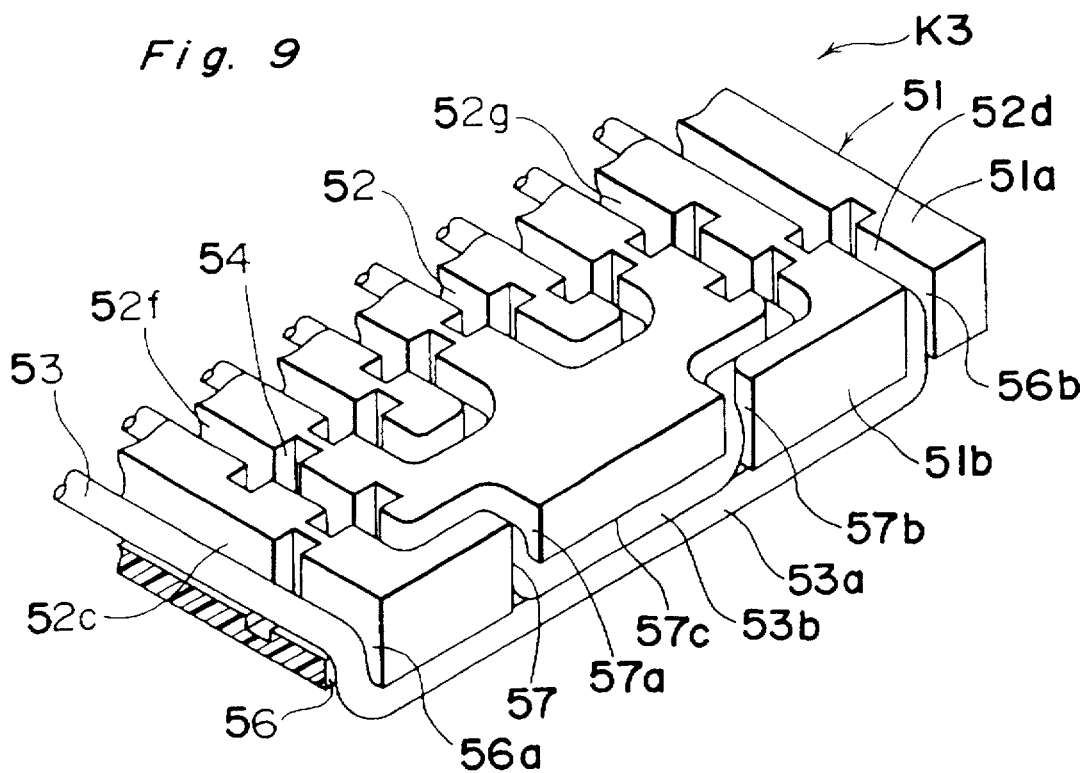
FIG. 9 is a fragmentary perspective view of an insulating plate of an electrical connection box having a wiring construction according to a third embodiment of the present invention.
Figure 10:
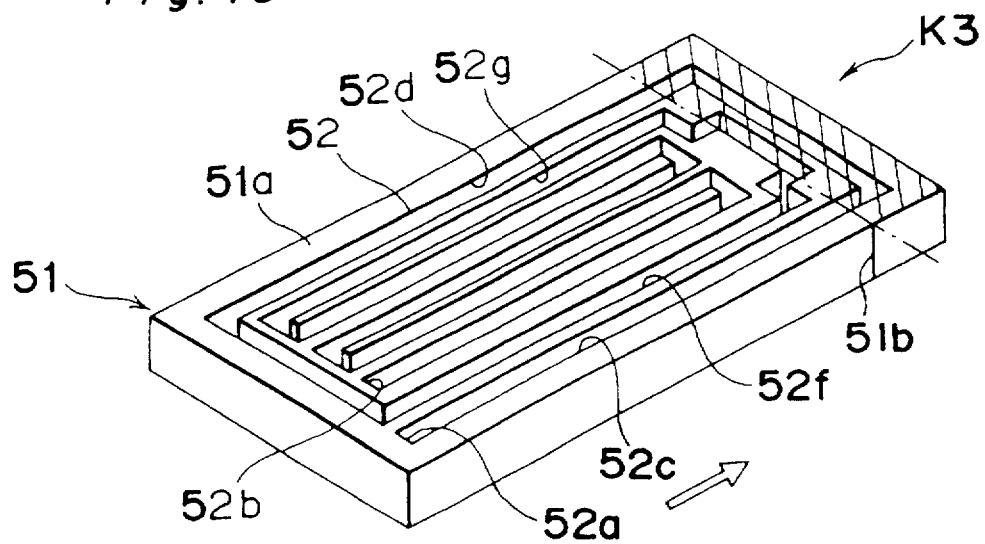
FIG. 10 is a perspective view explanatory of the insulating plate of FIG. 9.
Figure 11:
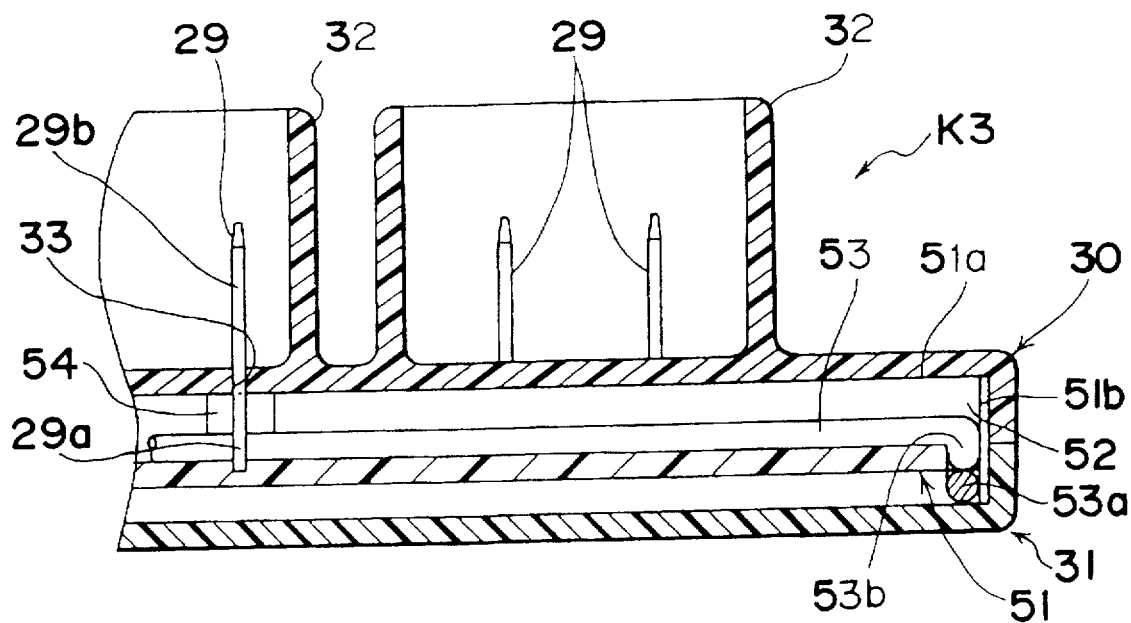
FIG. 11 is a fragmentary sectional view of the electrical connection box of FIG. 9.

FIGS. 9 and 10 show an insulating plate 51 of an electrical connection box of FIG. 11 having a wiring construction K3 according to a third embodiment of the present invention. In the wiring construction K3, a wiring groove 52 is formed along a wiring pattern on an upper face 51a of the insulating plate 51 so as to have a depth twice a diameter of a wire 53 to be inserted into the wiring groove 52. Meanwhile, at predetermined locations of the wiring groove 52, opposed faces of the wiring groove 52 are recessed so as to form, by widening the wiring groove 52, terminal driving portions 54 for driving the terminal driving terminals 29 thereinto, respectively.

The wiring pattern is designed such that portions 53a and 53b of the wire 53, which are not connected to the pressing contact terminal 29 over a long distance, are laid along one end face 51b of the insulating plate 51. Namely, when the end face 51b of the insulating plate 51 is obtained by removing the hatched portion from the insulating plate 51 in FIG. 10, the portions 53a and 53b of the wire 53 disposed at the hatched portion are laid along he end face 51b of the insulating plate 51. In accordance with this design of the wiring pattern, wiring grooves 56 and 57 are formed on the end face 51b of the insulating plate 51. The wiring groove 52 formed on the upper face 51a of the insulating plate 51 and the wiring grooves 56 and 57 formed on the end face 51b of the insulating plate 51 are communicated with each other such that the wire 53 can be laid on the insulating plate 51 continuously from one end 52a of the wiring groove 52 to the other end 52b of the wiring groove 52 via the wiring grooves 56 and 57.

More specifically, the wiring groove 56 formed on the end face 51b of the insulating plate 51 is constituted by longitudinal grooves 56a and 56b extending through the insulating plate 51 from the upper face 51a to a lower face of the insulating plate 51. Upper portions of the longitudinal grooves 56 and 57 are, respectively, extended into outermost ones 52c and 52d of the wiring groove 52. Thus, the outermost ones 52c and 52d of the wiring groove 52 extend to the end face 51b of the insulating plate 51 so as to be communicated with the longitudinal grooves 56a and 56b, respectively. Meanwhile, the wiring groove 57 is substantially U-shaped and is constituted by longitudinal grooves 57a and 57b formed on the end face 51b from the upper face 51a of the insulating plate 51 and a lateral groove 57c communicating with lower ends of the longitudinal grooves 57a and 57b. The longitudinal grooves 57a and 57b are disposed laterally inside the longitudinal grooves 56a and 56b, respectively. Inner ones 52f and 52g of the wiring groove 52 formed on the upper face 51a of the insulating plate 51 extend to the end face 51b of the insulating plate 51 so as to be communicated with the longitudinal grooves 57a and 57b, respectively.

In the same manner as the first embodiment, the wire 53 is laid in the wiring groove 52 continuously from one end 52a of the wiring groove 52 to the other end 52b of the wiring groove 52 by using the wire feeder 25 of FIG. 6. Therefore, the wire 53 laid along the end face 51b of the insulating plate 51 is drawn out of the end face 51b of the insulating plate 51 so as to extend continuously.

After the wire 53 has been continuously laid in the wiring groove 52 of the insulating plate 51, the portions 53a and 53b of the wire 53, which are drawn out of the insulating plate 51, are bent downwardly so as to be inserted into the wiring grooves 56 and 57, respectively. At this time, the portion 53b of the wire 53 can be inserted into the wiring groove 57, while the portion 53a of the wire 53 is further extended downwardly from lower ends of the grooves 56a and 56b so as to be hung from the lower ends of the grooves 56a and 56b.

Subsequently, the pressing contact terminals 29 are driven into terminal driving portions 54 of the insulating plate 51. Thus, the edge of the slot of she pressing contact portion 29a of each of the pressing contact terminals 29 is thrust into an insulating coating of the wire 53 held in the wiring groove 52 such that each of the pressing contact terminals 29 is connected to a conductor of the wire 53 through pressing contact. Thereafter, predetermined locations of the wire 53, which are disposed in the wiring groove 52 of the insulating plate 51, are cut so as to divide the wire 53 into a plurality of independent circuit portions.

After the wire 53 and the pressing contact terminals 29 have been mounted on the insulating plate 51 as described above, the upper casing 30 and the lower casing 31 are assembled with the insulating plate 51 as shown in FIG. 11 such that the electrical connection box is obtained. Meanwhile, if the wiring groove 52 is formed on the lower face of the insulating plate 51, the wire 53 laid along the end face 51b is bent upwardly so as to be accommodated in a gap between the insulating plate 51 and the casing.

Figure 12:
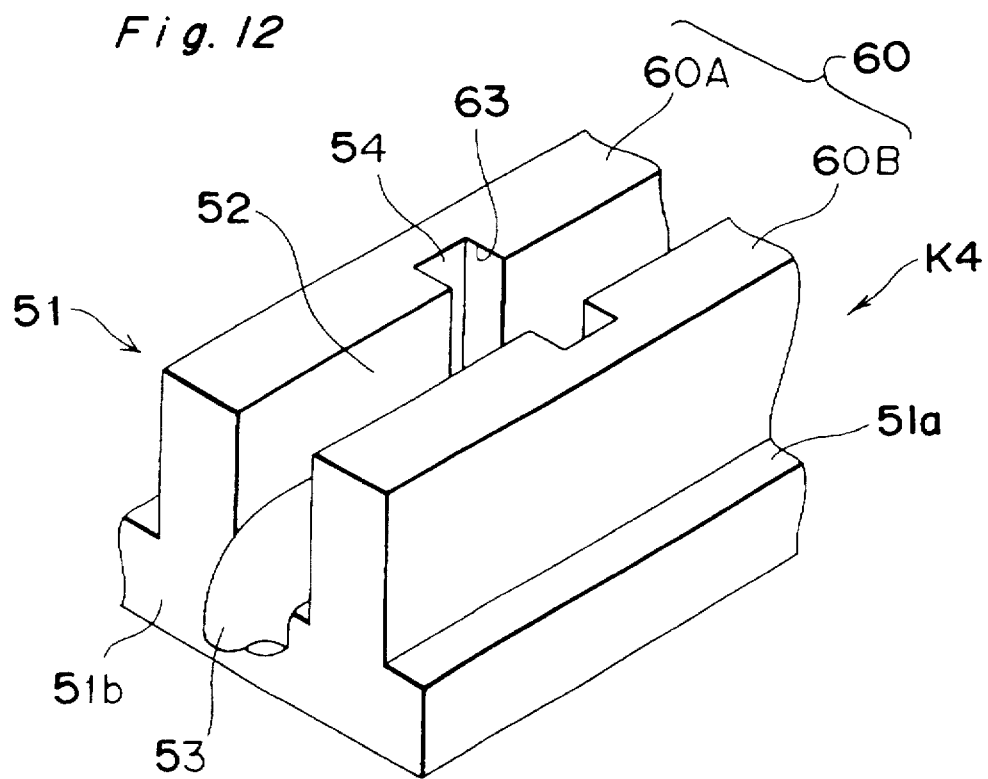
FIG. 12 is an enlarged fragmentary perspective view of an insulating plate of an electrical connection box having a wiring construction according to a fourth embodiment of the present invention.

FIG. 12 shows the insulating plate 51 of an electrical connection box having a wiring construction K4 according to a fourth embodiment of the present invention. In the fourth embodiment, a plurality of pairs of wiring projections 60 (60A and 60B) fro guiding the wire 53 are provided at predetermined locations on the upper face 51a and/or the lower face of the insulating plate 51 along a wiring pattern in the same manner as the second embodiment. A distance between the wiring projections 60A and 60B may be increased such that two or three wires 53 are arranged between the wiring projections 60A and 60B.

At locations of the insulating plate 51 where the wire 53 is laid along the end face 51b of the insulating plate 51, the wiring projections 60 also extend to the end face 51b of the insulating plate 51 in the same manner as the wiring groove 52 of the third embodiment and thus, the wire 53 is drawn out of the end face 51b of the insulating plate 51 so as to be laid continuously. A pair of recesses 63 acting as the terminal driving portion 54 of the third embodiment are, respectively, formed at a predetermined location on opposed faces of each pair of the wiring projections 60.

Meanwhile, in the fourth embodiment, since thickness of the insulating plate 51 is small, the wiring grooves are not formed on the end face 51b of the insulating plate 51 and the wire 53 is merely laid along the end face 51b of the insulating plate 51 so as to be closely retained in a gap between the end face 51b of the insulating plate 51 and an inner periphery of the casing.

In the wiring construction of the electrical connection box of the third and fourth embodiments of the present invention, since the wire is laid on the insulating plate and the portions of the wire disposed adjacent to the end face of the insulating plate are drawn out of the end face of the insulating plate so as to be laid vertically along the end face of the insulating plate, space for the portions of the wires are not required to be provided on the upper face of the insulating plate, so that area of the insulating plate can be reduced accordingly. In other words, if area of the insulating is fixed, it is possible to lay the wire at high density.

Furthermore, if the wiring grooves are formed on the end face of the insulating plate and the wire is inserted into the wiring grooves so as to be laid, not only the wire can be laid precisely along the predetermined wiring pattern and the wire laid along the end face of the insulating plate can be protected from damage.

Figure 13:
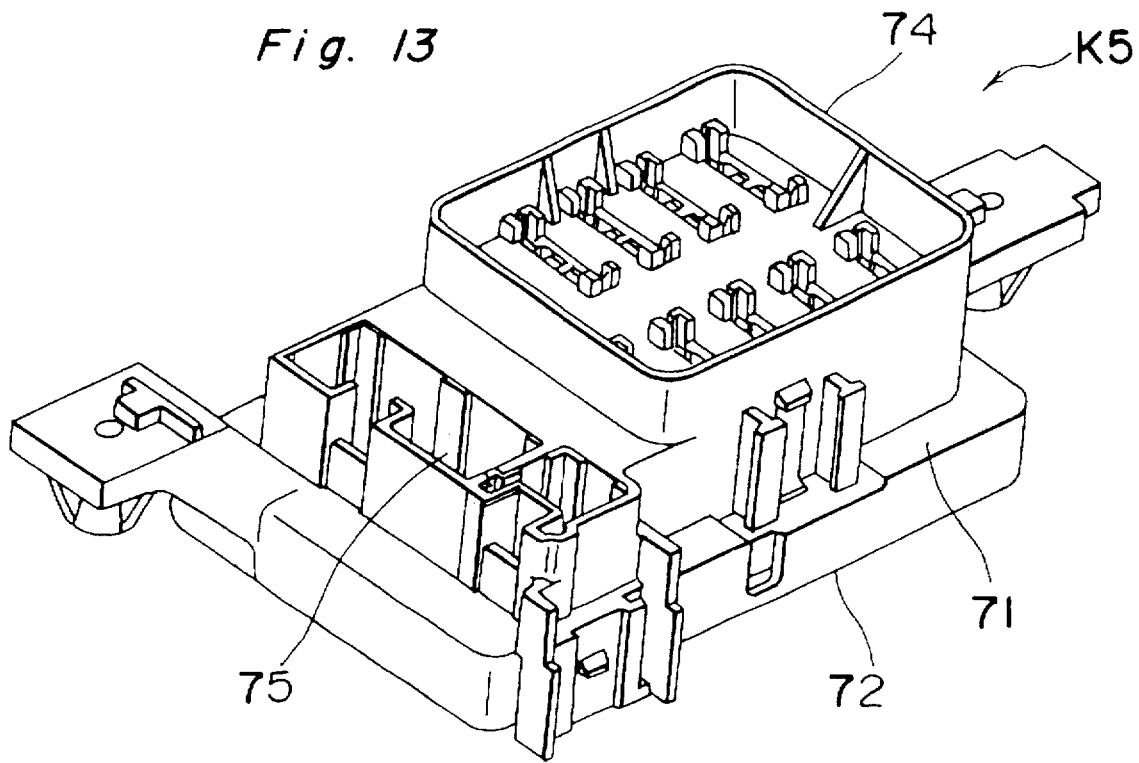
FIG. 13 is a perspective view of an electrical connection having a wiring construction according to a fifth embodiment of the present invention.
Figure 14:
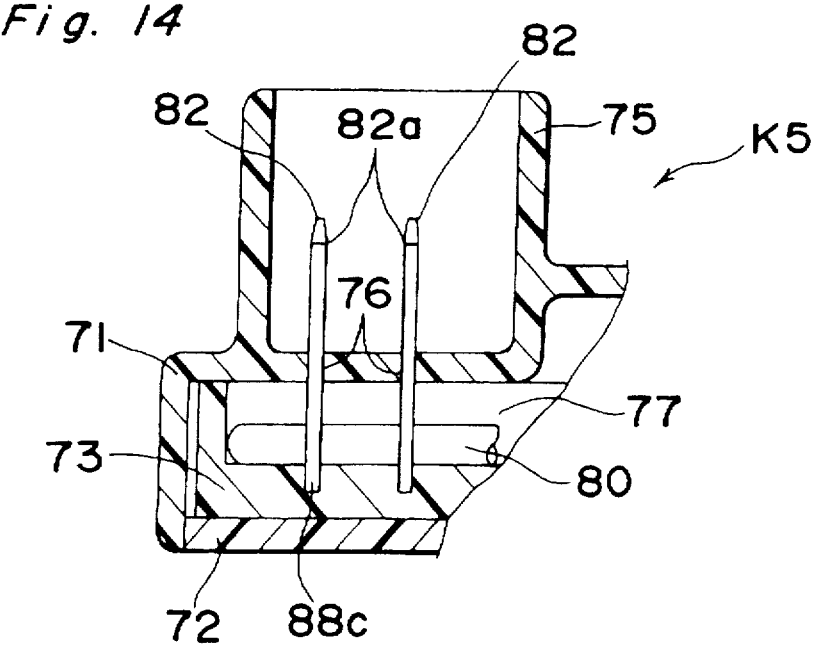
FIG. 14 is an enlarged fragmentary sectional view of the electrical connection box of FIG. 13.

FIGS. 13 and 14 show an electrical connection box having a wiring construction K5 according to a fifth embodiment of the present invention. In the electrical connection box, an insulating plate 73 is gripped in a space defined between an upper casing 71 and a lower casing 72 as shown in FIG. 14. The upper and lower casings 71 and 72 are obtained by molding electrically insulating synthetic resin such as polypropylene. A fuse fitting portion 74 and a connector fitting portion 75, each of which has a tubular shape, are projected from outer surfaces of the upper and lower casings 71 and 72, respectively. Terminal holes 76 are formed on a bottom wall of each of the fuse fitting portion 74 and the connector fitting portion 75. Fuses (not shown) and connectors (not shown) extending from various electrical components are adapted to be connected to the fuse fitting portion 74 and the connector fitting portion 75, respectively.

Figure 15:
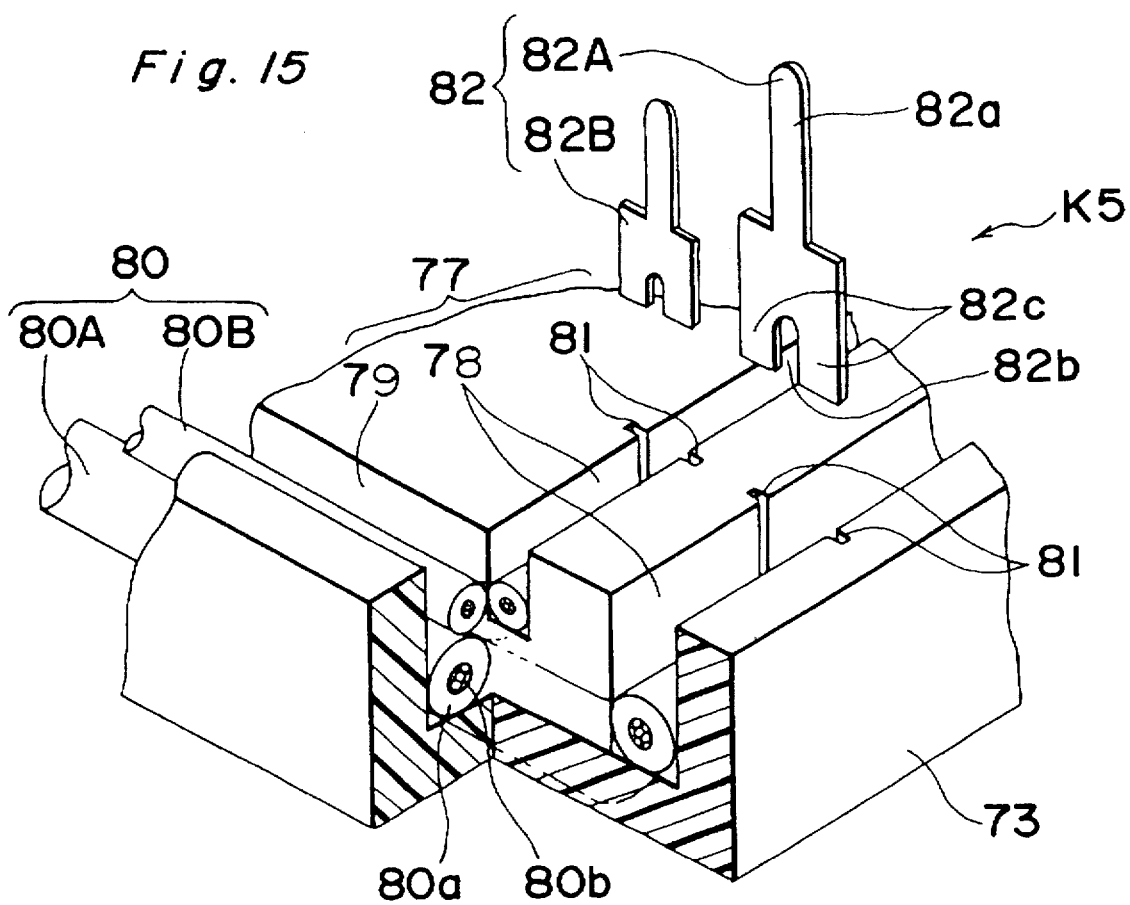
FIG. 15 is an enlarged fragmentary perspective view of an insulating plate of the electrical connection box of FIG. 13.

The insulating plate 73 is obtained by molding material similar to that of the upper and lower casings 71 and 72. A wiring groove 77 is formed on one face of the insulating plate 73 in accordance with a predetermined wiring pattern. The wiring groove 77 includes independent grooves 78 and common grooves 79 as shown in FIG. 15. In the vicinity of corner portions of the insulating plate 73, independent grooves 78 and the common grooves 79 extend along outer edges of the insulating plate 73 and intersect with each other substantially orthogonally so as to be communicated with each other.

The independent grooves 78 have a width substantially equal to or slightly smaller than an outside diameter of a wire 80 (large-diameter wire 80A or small-diameter wire 80B). As location on the insulating plate 73 comes closer to a central portion of the insulating plate 73 from the outer edges of the insulating plate 73, depth of the independent grooves 78 is increased gradually sequentially by the outside diameter of the wire 80. By increasing width of each of the independent grooves 78, a terminal driving portion 81 opening to upper and lower faces of the insulating plate 37 is formed at each of the independent grooves 78. On the other hand, each of the common grooves 79 has width equal to that of the independent groove 78 for the large-diameter wire 80A and has a depth equal to the largest depth of the independent grooves 78.

A pressing contact terminal 82 to be press fitted into the terminal driving portion 81 is classified into a pressing contact terminal 82A for the large-diameter wire 80A and a pressing contact terminal 82B for the small-diameter wire 80B. As shown in FIG. 15, the pressing contact terminals 82A and 82B are formed into a similar shape by using electrically conductive metal plates. More specifically, a male type input-output terminal portion 82a is provided at one end portion of the pressing contact terminal 82, while a bifurcate pressing contact portion 82c having a slot 82b formed at its central portion is provided at the other end portion of the pressing contact terminal 82. The pressing contact portion 82c is press fitted into the terminal driving portion 81, so that opposed side edges of the slot 82b are thrust into an insulating coating 80a of the wire 80 laid in the wiring groove 77 beforehand so as to be electrically connected to a conductor 80b of the wire 80. On the other hand, when the insulating plate 73 has been gripped between the upper and lower casing 71 and 72 so as to be accommodated in the upper and lower casing 71 and 72, the input-output terminal portions 82a of the pressing contact terminals 82 project into the fuse fitting portion 74 and the connector fitting portion 75 through the terminal holes 76.

Hereinafter, assembly of the electrical connection box having the wiring construction KS referred to above is described. Initially, the face of the insulating plate 73, on which the insulating groove 77 is formed, is oriented upwardly and the wire 80 is directly inserted into the wiring groove 77 by using a wire feeder (not shown) The wire 80 is inserted into the independent grooves 78 sequentially in decreasing order of depth of the independent grooves 78. Thus, the wires 80 are laid in the common grooves 79 so as to be piled on each other sequentially from the deepest wire 80 in the independent groove 78.

Subsequently, the pressing contact portion 82c of the pressing contact terminal 82 is press fitted into each of the terminal driving portions 81. At the time of this press fitting, the opposed side edges of the slot 82b of the pressing contact terminal 82 are thrust into the insulating coating 80a of the wire 80 so as to be connected to the conductor 80b of the wire 80. By press fitting the pressing contact terminals 82 into the terminal driving portions 81 sequentially in this way so as to secure the pressing contact terminals 82 to the insulating plate 73, it is possible to positively check whether or not the pressing contact terminals 82 are electrically connected to the wires 80 properly if electrical conduction among the pressing contact terminals 82 is inspected before the insulating plate 73 is accommodated in the upper and lower casings 71 and 72.

Thereafter, the lower casing 72 is fitted into an opening of the upper casing 71 so as to be assembled with the upper casing 71 such that the insulating plate 73 is gripped between the upper and lower casings 71 and 72. At this time, the input-output terminal portions 82a of the pressing contact terminals 82 project into the fuse fitting portion 74 and the connector fitting portion 75 through the terminal holes 76, respectively.

In the electrical connection box assembled as described above, a power circuit is formed by the large-diameter wires 80A and the pressing contact terminals 82A connected to the large-diameter wires 80A through pressing contact and fuses are connected to the input-output terminal portions 82a of the pressing contact terminals 82A in the fuse fitting portion 74. Meanwhile, a load circuit is formed by the small-diameter wires 80B and the pressing contact terminals 82B connected to the small-diameter wires 80B through pressing contact. Thus, by fitting connectors into the connector fitting portion 75, various electrical components and the small-diameter wires 80B are electrically connected to each other through the pressing contact terminals 82B. Namely, since bus bars are not used for an internal circuit of the electrical connection box, it is possible to easily cope with design changes of the internal circuit if the wiring groove 77 is formed on the insulating plate 73 in accordance with a wiring pattern supposed to be used in future.

Meanwhile, in the electrical connection box, since the wire 80 is directly inserted into the wiring groove 77 of the insulating plate 73, a wiring die is not required to be used and thus, operation for transferring the wire 80 to the upper casing 71 or the lower casing 72 is not required to be performed, thereby resulting in reduction of production cost of the electrical connection box. Furthermore, since a plurality of the wires 80 can be laid in the common groove 79 so as to be piled on each other in a direction of thickness of the insulating plate 73, horizontal dimension, i.e., lateral dimension of the insulating plate 73 can be reduced and thus, the insulating plate 73 can be made compact.

Figure 16:
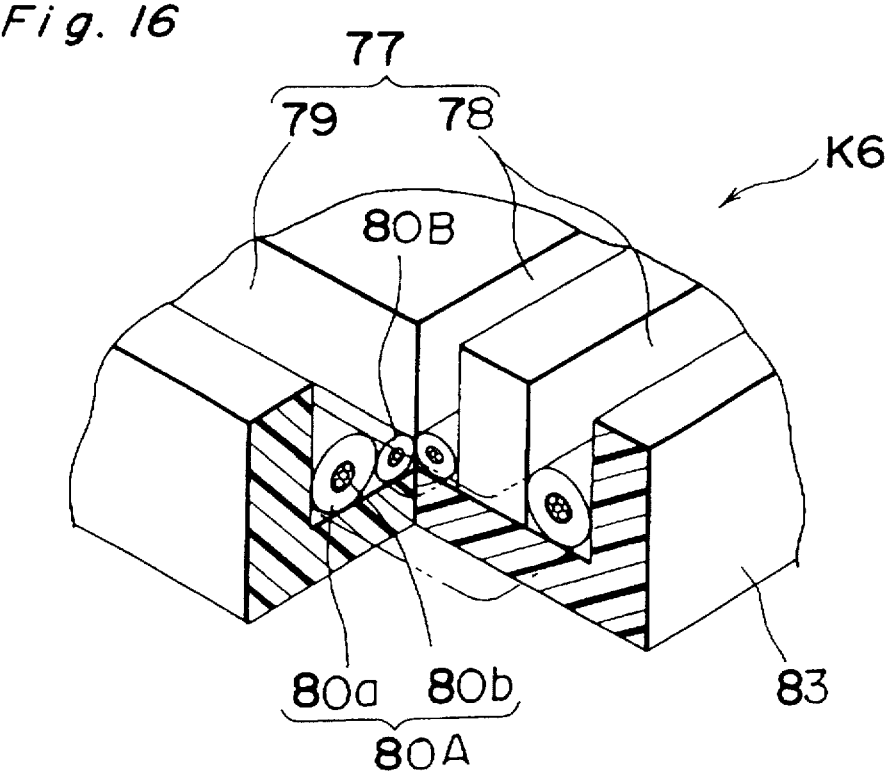
FIG. 16 is an enlarged fragmentary perspective view of an insulating plate of an electrical connection box having a wiring construction according to a sixth embodiment of the present invention.

FIG. 16 shows an insulating plate 83 of an electrical connection box having a wiring construction K6 according to a sixth embodiment of the present invention. Since other constructions of the electrical connection box are substantially identical with those of the electrical connection box of the fifth embodiment, the description is abbreviated for the sake of brevity. In the same manner as the fifth embodiment, the wiring groove 77 of the insulating plate 83 includes the independent grooves 78 and the common grooves 79. The independent groove 78 has a width substantially equal to or slightly smaller than the outside diameter of the wire 80 to be laid in the independent groove 78 and has a depth twice the outside diameter of the wire 80 or more. On the other hand, the common groove 79 has a width not less than a sum of the outside diameters of the wires 80 laid from a plurality of the independent grooves 78 to the common groove 79 and has a depth equal to that of the independent grooves 78.

In the insulating plate 83, in case the wire 80 is inserted into the wiring groove 77, the wires 80 laid in the independent grooves 78, respectively are arranged side by side in the common groove 79. Therefore, thickness of the insulating plate 83 is restrained and width of the insulating plate 83 can be reduced by bringing the wires 80 into contact with each other in the common groove 79.

Figure 17:
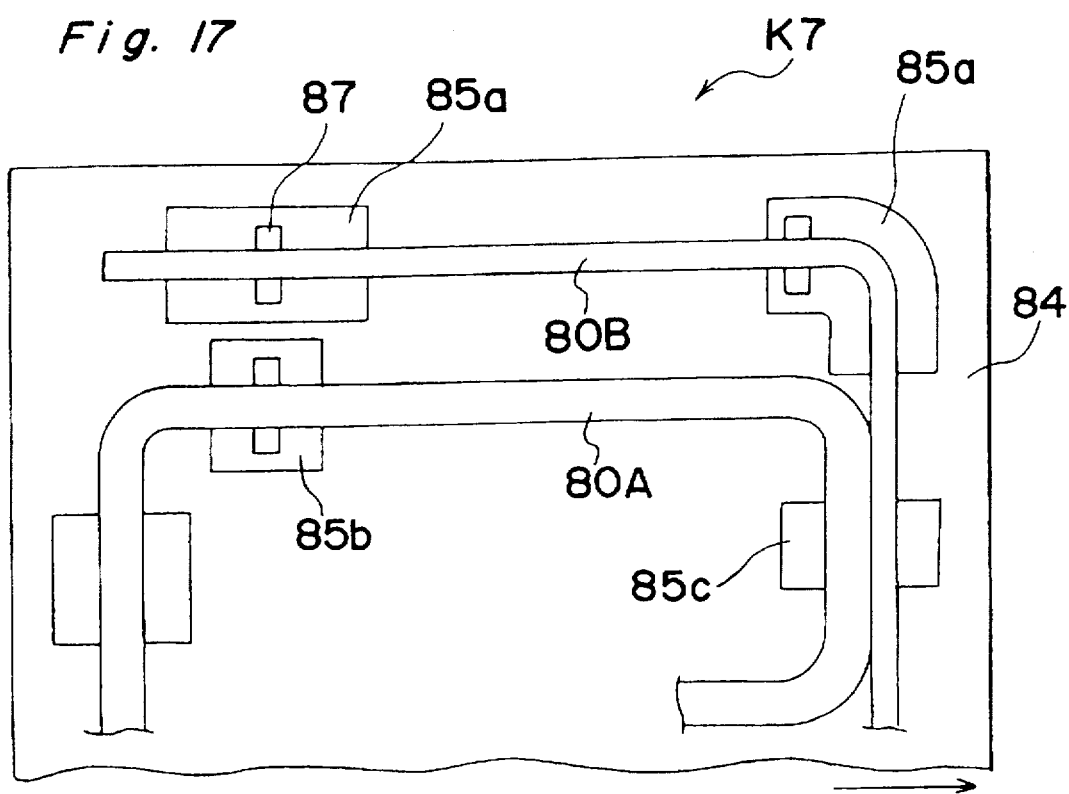
FIG. 17 is a top plan view of an insulating plate of an electrical connection box having a wiring construction according to a seventh embodiment of the present invention.
Figure 18:
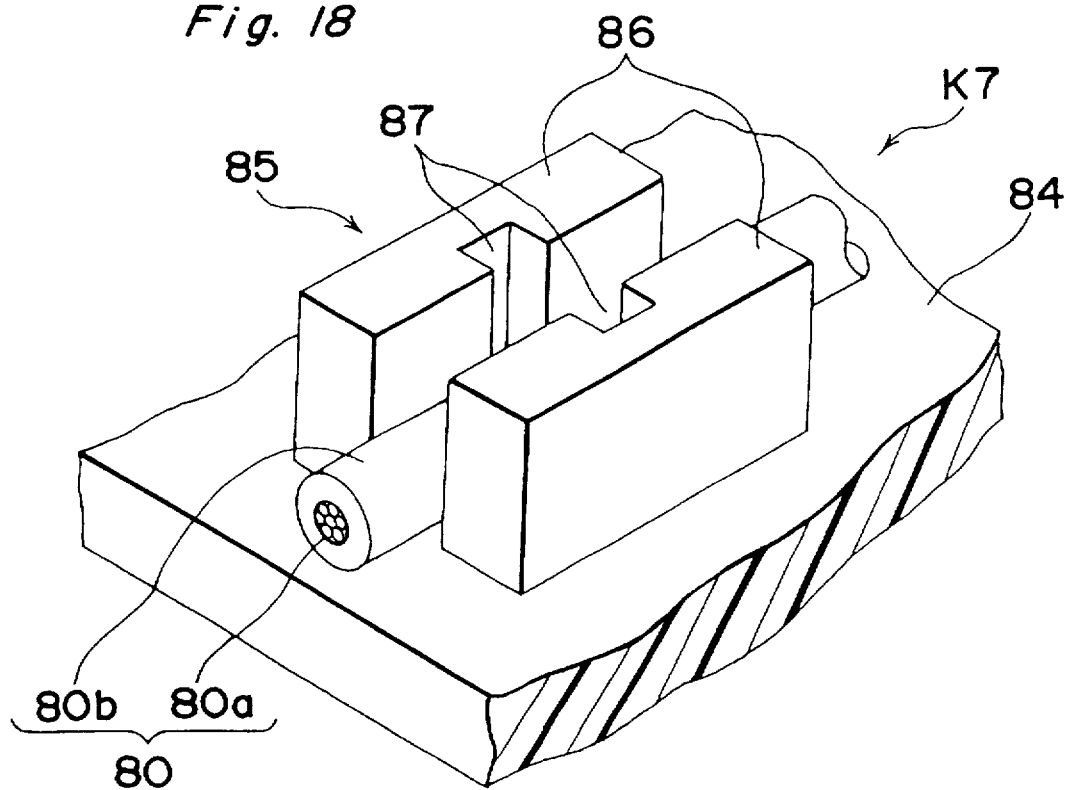
FIG. 18 is an enlarged fragmentary perspective view of the insulating plate of FIG. 17.

FIGS. 17 and 18 show an insulating plate 84 of an electrical connection box having a wiring construction K7 according to a seventh embodiment of the present invention. Since other constructions of the electrical connection box are substantially identical with those of the electrical connection box of the fifth embodiment, the description is abbreviated for the sake of brevity. The insulating plate 84 does not have the insulating groove 77 of the fifth and sixth embodiments but has a plurality of pairs of wiring projections 85, e.g., independent wiring projections 85a and 85b and common wiring projections 85c.

Each pair of wiring projections 85 are formed by a pair of opposed walls 86 and the wiring projections 85 are provided at predetermined locations on the insulating plate 84. At portions of the insulating plate 84 where direction for laying the wire 80 should be changed, for example, at corner portions of the insulating plate 84, the wiring projections 85 are curved so as to enable the wire 80 to be bent easily. The independent wiring projections 85a are used for the small-diameter wire 80B, while the independent wiring projections 85b are used for the large-diameter wire 80A. Meanwhile, the common wiring projections 85c are used for guiding the large-diameter wire 80A and the small-diameter wire 80B. Since the common wiring projections 85c hold the large-diameter wire 80A and the small-diameter wire 80B in contact with each other, dimension of the insulating plate 84 in the direction of the arrow in FIG. 17 can be restrained. In this case, since wiring can be performed by merely guiding the wire 80 by the wiring projections 85, wiring can be performed more easily than a case in which the wire 80 is inserted into the wiring groove 77. As shown in FIG. 18, a pair of terminal driving portions 87 for press fitting the pressing contact portion 82c of the pressing contact terminal 82 thereinto are formed on each pair of the wiring projections 85.

In the fifth to seventh embodiments, the wiring groove 77 and the wiring projections 85 are provided on only one of opposite faces of the insulating plate but may be, needless to say, provided on the opposite faces of the insulating plate.

In the wiring construction of the fifth and sixth embodiments, since the wiring groove is formed on the insulating plate and the pressing contact terminals are press fitted into the terminal driving portions formed at the wiring groove, the hitherto necessary wiring die is not required to be used and thus, production cost of the electrical connection box can be lowered. Meanwhile, wiring and connection of the wire to the pressing contact terminals can be performed stably and inspection of whether or not wiring and connection of the wire to the pressing contact terminals is performed properly can be made prior to completion of assembly of the electrical connection box. Furthermore, since a plurality of the wires laid in the independent grooves, respectively can be laid in the common groove, the insulating plate can be made compact.

Meanwhile, in case a plurality of the wires are laid in the common groove so as to be piled on each other, horizontal size of the insulating plate can be restricted. On the other hand, in case a plurality of the wires are laid in the common groove so as to be arranged side by side, thickness of the insulating plate can be reduced.

In the wiring construction of the seventh embodiment, since the wire is positioned by the wiring projections in place of the wiring groove, production cost of the electrical connection box can be reduced further.

Figure 19:
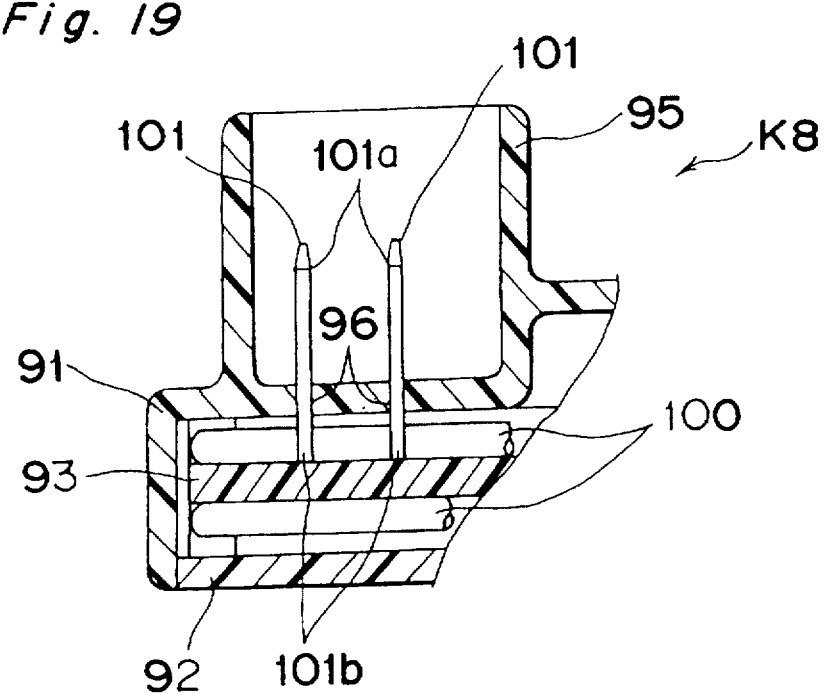
FIG. 19 is a fragmentary sectional view of an electrical connection box having a wiring construction according an eighth embodiment of the present invention.

FIG. 19 shows an electrical connection box having a wiring construction K8 according to an eighth embodiment of the present invention. The wiring construction K8 is similar to the wiring construction K5. Thus, an insulating plate 93 is gripped in a space defined between an upper casing 91 and a lower casing 92 of the electrical connection box and terminal holes 96 are formed on bottom walls of a fuse fitting portion (not shown) and a connector fitting portion 95. Wiring grooves 97 and wiring slots 98 are formed on []opposite faces of the insulating plate 93 in accordance with predetermined wiring patterns. Terminal driving portions 99 are formed at predetermined locations of the wiring groove 97 by increasing width of the wiring groove 97. Meanwhile, the wiring slots 98 are formed at an outer edge of the insulating plate 93 so as to have a width substantially equal to an outside diameter of a wire 100 to be laid and are flush with neighboring ones of the wiring grooves 97 so as to be communicated with the neighboring ones of the wiring grooves 97.

Pressing contact terminals 101 to be press fitted into the terminal driving portions 99 are formed by blanking electrically conductive metal plates. Each of the pressing contact terminal 101 has an input-output terminal portion 101a and a substantially U-shaped pressing contact portion 101b. The wire 100 has an insulating coating 100a and a conductor 100b. Since other constructions of the electrical connection box are similar to those of the electrical connection box of the fifth embodiment, the description is abbreviated for the sake of brevity.

Figure 20:
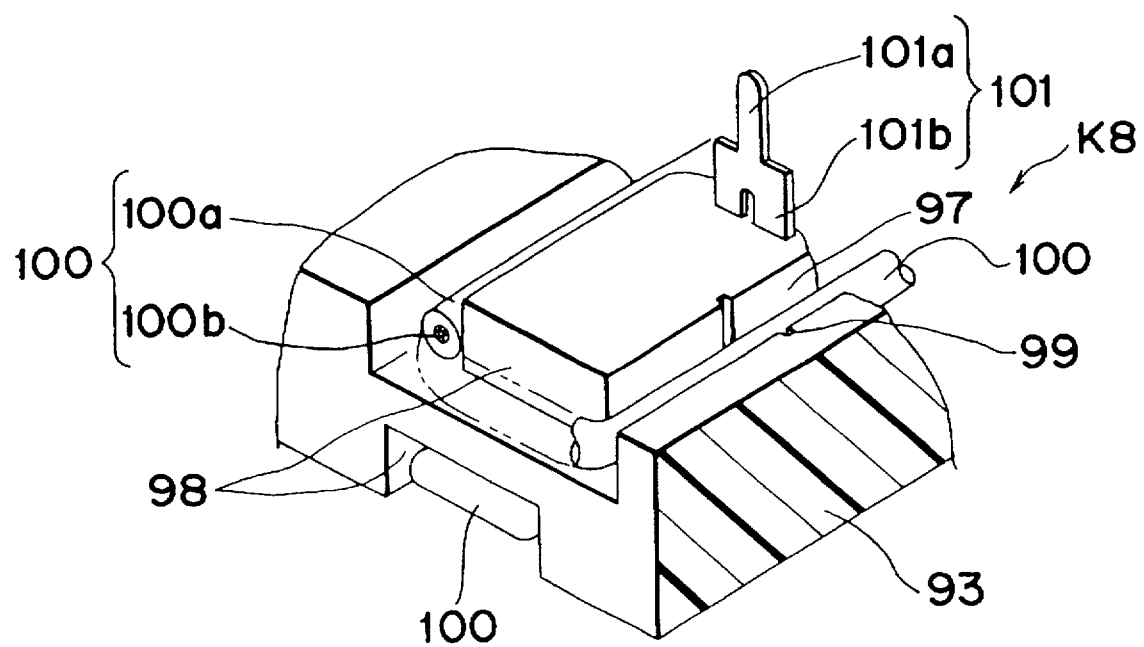
FIG. 20 is an enlarged fragmentary perspective view of an insulating plate of the electrical connection box of FIG. 19.
Figure 21:
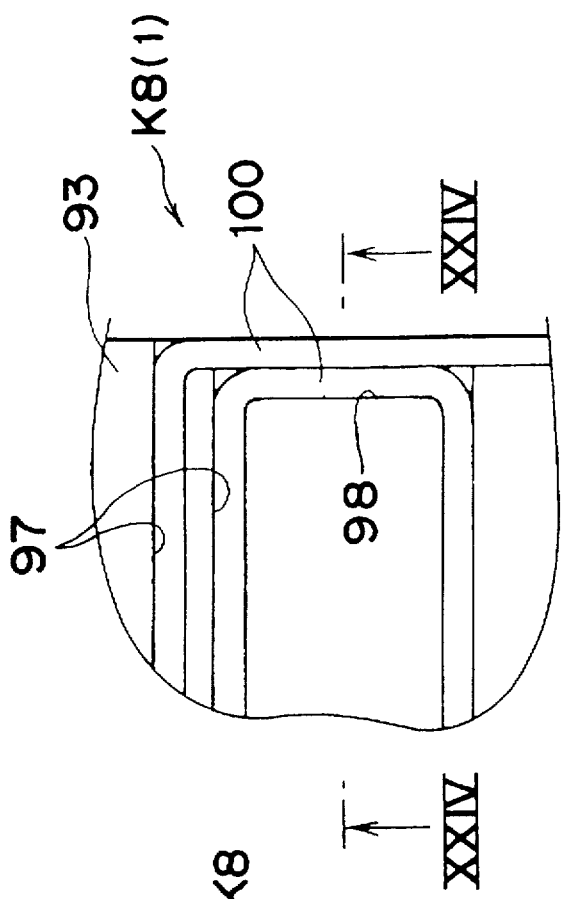
FIG. 21 is a fragmentary top plan view of the insulating plate of FIG. 20.
Figure 22:
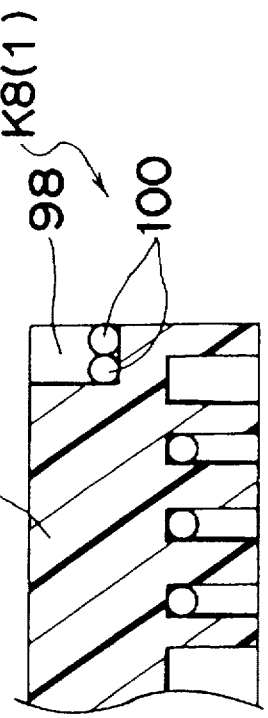
FIG. 22 is a sectional view taken along the line XXII—XXII in FIG. 21.
Figure 23:
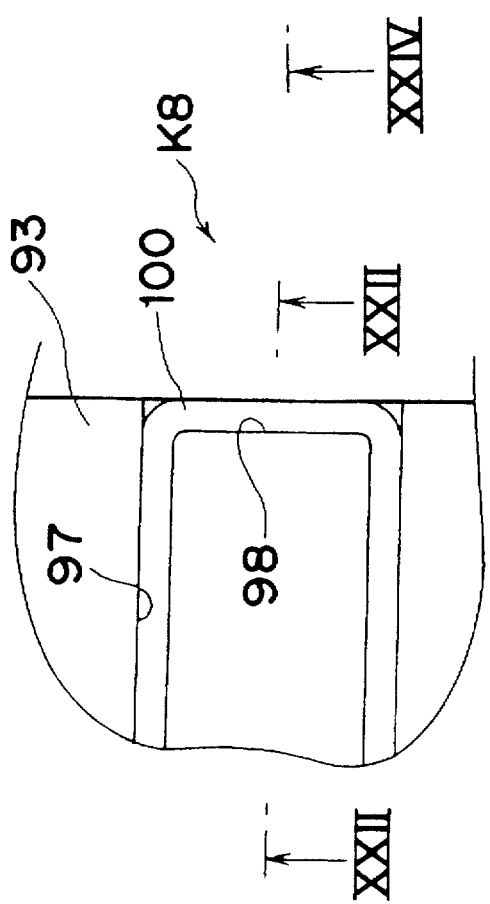
FIG. 23 is a fragmentary top plan view of an insulating plate of an electrical connection box having a wiring construction which is a first modification of the wiring construction of FIG. 19.
Figure 24:
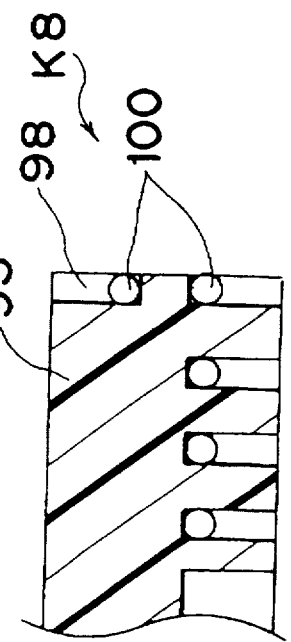
FIG. 24 is a sectional view taken along the line XXIV—XXIV in FIG. 23.

The electrical connection box of the above described arrangement is assembled as follows. Namely, the wire 100 is initially laid in the wiring grooves 97 and the wiring slots 98 of the insulating plate 93 by using a wire feeder (not shown). As shown in FIGS. 20 and 21, the wire 100 is bent substantially orthogonally at opposite edges of the wiring snot 98 so as to extend into the neighboring wiring grooves 97 in a U-shaped configuration such that the wire 100 is brought into pressing contact with a side wall of the wiring slot 98. Hence, although the wiring slot 98 has only one side wall in contrast with opposed side walls of the wiring groove 97, the wire 100 is not detached from the wiring slot 98 and the wire 100 laid in the wiring slot 98 is positioned so as to extend along the outer edge of the insulating plate 93.

Subsequently, the pressing contact portions 101b of the pressing contact terminals 101 are press fitted into the terminal driving portions 99 of the insulating plate 93. As a result, opposed side edges of a slot of the pressing contact portion 101b are thrust into the insulating coating 100a of the wire 100 so as to be electrically connected to the conductor 100b of the wire 100.

Thereafter, the insulating plate 93 is accommodated in the space defined between the upper casing 91 and the lower casing 92 so as to be gripped between the upper and lower casings 91 and 92.

In the electrical connection box assembled as described above, since the wiring slots 98 are formed on the insulating plate 93 so as to enable the wire 100 to be laid along the outer edge of the insulating plate 93, the insulating plate 93 can be made compact. Namely, since the wire 100 is not required to be guided from its opposite sides at the outer edge of the insulating plate 93, only one side wall is sufficient for the wiring slot 98, so that horizontal size of the insulating plate 93 can be restrained and thus, the upper and lower casings 91 and 92 for receiving the insulating plate 93 can also be made compact.

Hereinafter, first, second and third modifications K8(1), K8(2) and K8(3) of the eighth embodiment are described with reference to FIGS. 23 and 24, FIGS. 25 and 26 and FIGS. 27 and 28, respectively. Namely, in the eighth embodiment, only one wire 100 is laid in the wiring slot 98 but a plurality of the wires 100 may also be laid in the wiring slot 98. In case a plurality of, for example, two wires 100 are laid side by side in the wiring slot 98 as shown in the first modification K8(1) of FIGS. 23 and 24, width of the wiring slot 98 may be set to not less than a sum of the outside diameters of the two wires 100. On the other hand, in case a plurality of the wires 100 are piled on each other in the wiring slot 98, depth of the wiring slot 98 may be set to not less than a sum of the wires 100.

Meanwhile, in the eighth embodiment, the wire 100 is laid in the wring grooves 97 and the wiring slots 98. However, in the second modification K8(2) shown in FIGS. 25 and 26, a plurality of pairs of wiring projections 102 confronting each other and spaced a predetermined distance from each other are provided at predetermined locations of the insulating plate 93 in place of the wiring groove 97 and a pair of projecting guides 103 are provided at locations spaced a predetermined dimension inwardly from the outer edge of the insulating plate 93 in place of the wiring slot 98. By using the wiring projections 102 and the projecting guides 103, wiring can be performed more smoothly than the wiring grooves 97 and the wiring slots 98 and amount of resin required for molding the insulating plate 93 can be saved.

Furthermore, in the eighth embodiment or the second modification K8(2), the wire 100 is prevented by the wiring slot 98 or the projecting guides 103 from penetrating into the insulating plate 93. However, in the third modification K8(3) shown in FIGS. 27 and 28, the wiring slot 98 and the projecting guides 103 are eliminated such that the corresponding side face and the corresponding upper face of the insulating plate 93 are made flat. Thus, amount of resin required for molding the insulating plate 93 can be further reduced, thereby resulting in drop of production cost of the electrical connection box.

In the eighth embodiment, since the wire is directly laid in the wiring groove or between the wiring projections formed on the insulating plate, a wiring die is not required to be provided and operation for transferring the wire to the casing or the insulating plate is not required to be performed, thereby resulting in large reduction of production cost of the electrical connection box.

Meanwhile, since the wire can be laid along the outer edge of the insulating plate, horizontal dimension of the insulating plate can be reduced. As a result, not only the electrical connection box can be made compact but wiring can be performed easily.

In case a pair of the projecting guides are provided at the outer edge portion of the insulating plate, wiring can be performed easily. Meanwhile, if the wiring groove is extended to the outer edge of the insulating plate and the wire is laid along the outer edge of the insulating plate so as to project from the outer edge of the insulating plate, amount of resin required for molding the insulating plate can be reduced, thereby resulting in drop of production cost of the electrical connection box.

Figure 29:
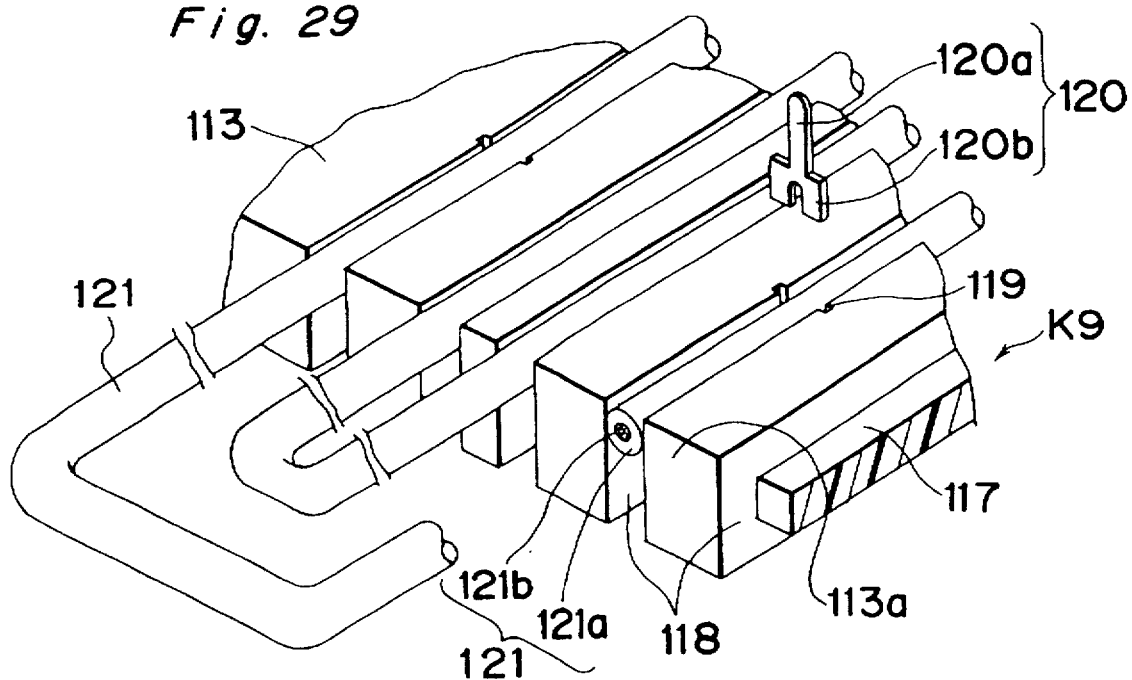
FIG. 29 is a fragmentary perspective view of an insulating plate of an electrical connection box having a wiring construction according to a ninth embodiment of the present invention.

FIG. 29 show an insulating plate 113 of an electrical connection box having a wiring construction K9 according to a ninth embodiment of the present invention. The wiring construction K9 is similar to the wiring construction K8. Wiring grooves 117 are formed on opposite faces of the insulating plate 113 in accordance with predetermined wiring patterns and a wire 121 laid continuously in the wiring groove 117 on the upper face of the insulating plate 113 is turned down so as to proceed to the wiring groove 117 on the lower face of the insulating plate 113. The wire 121 has an insulating coating 121a and a conductor 121b.

Namely, the wiring groove 117 is formed on the upper face of the insulating plate 113 such that the wire 121 is continuously laid in the wiring groove 117 on the upper face of the insulating plate 113. At a portion of the wiring groove 117 on the upper face of the insulating plate 113, where the wire 121 is turned down to the lower face of the insulating plate 113, the wiring groove 117 on the upper face of the insulating plate 113 is extended to a side face 113a of the insulating plate 113. Likewise, at a portion of the wiring groove 117 on the lower face of the insulating plate 113, where the wire 121 turned down from the wiring groove 117 on the upper face of the insulating plate 113 is inserted, the wiring groove 117 on the lower face of the insulating plate 113 is extended to the side face 113a of the insulating plate 113.

The above mentioned extension of the wiring groove 117 to the side face 113a is not restricted to only one side face.

In case the insulating plate 113 is rectangular, the wiring groove 117 may be extended to four side faces of the insulating plate 113.

By recessing the side face 113a of the insulating plate 113, a vertical groove 118 is formed so as to vertically connect the wiring grooves 117 extending to the side face 113a on the upper and lower faces of the insulating plate 113. Therefore, the wire 121 can be turned down from the wiring groove 117 on the upper face of the insulating plate 113 to the wiring groove 117 on the lower face of the insulating plate 113 through the vertical groove 118.

Meanwhile, the vertical groove 118 is not necessarily required to be provided. In this case, the wire 121 can be laid from the wiring groove 117 on the upper face of the insulating plate 113 to the wiring groove 117 on the lower face of the insulating plate 113 along she side face 113a of the insulating plate 113. However, if the vertical groove 118 is used, the wire 121 can be positioned and held more easily and can be protected more positively.

Terminal driving portions 119 for receiving pressing contact terminals 120, respectively are formed at predetermined locations of the wiring grooves 117 by increasing width of the wiring grooves 117. Each of the pressing contact terminals 120 has an input-output terminal portion 120a and a substantially U-shaped pressing contact portion 120b. Since other constructions of the electrical connection box are similar to those of the electrical connection box of the eighth embodiment, the description is abbreviated for the sake of brevity.

The electrical connection box of the above described arrangement is assembled as follows. Namely, the wire 121 is inserted into the wiring groove 117 on the upper face of the insulating plate 113 from a starting point of the wiring groove 117 by a wire feeder (not shown). At the location of the wiring groove 117, where the wiring groove 117 extends to the side face 113a, the wire 121 is drawn outwardly from the side face 113a of the insulating plate 113. A length of the wire 121, over which the wire 121 is drawn from the side face 113a of the insulating plate 113, is a sum of a length of the vertical groove 118 and a length of the wire 121 laid continuously in the wiring groove 117 on the lower face of the insulating plate 113. After the wire 121 in the wiring groove 117 on the upper face of the insulating plate 113 has been drawn outwardly over the predetermined length from the side face 113a of the insulating plate 113, the wire 121 is again inserted from the side face 113a into the wiring groove 117 on the upper face of the insulating plate 113. In this way, the wire 121 is laid continuously in the wiring groove 117 on the upper face of the insulating plate 113 by drawing the wire 121 outwardly over the predetermined length from the side face 113a at portions of the insulating plate 113, where the wiring groove 117 is extended to the side face 113a.

Subsequently, the portions of the wire 121 drawn outwardly from the side face 113a of the insulating plate 113 are bent along the side face 113a so as to be inserted into the vertical grooves 118 and the wiring groove 117 on the lower face of the insulating plate 113 sequentially. At this time, by inserting the wire 121 into the vertical groove 118 and then, bending the wire 121 towards the wiring groove 117 on the lower face of the insulating plate 113, the wire 121 can be positioned and held easily. When the wire 121 is further bent from a lower edge of the vertical groove 118 to the wiring groove 117 on the lower face of the insulating plate 113, the wire 121 can be easily inserted into the wiring groove 117 on the lower face of the insulating plate 113. Therefore, the wire 121 is continuously laid in the wiring grooves 117 on the upper and lower faces of the insulating plate 113.

Thereafter, by press fitting the pressing contact portion 120b of the pressing contact terminal 120 into each of the terminal driving portions 119, the pressing contact terminal 120 is electrically connected to the conductor 121b of the wire 121. Then, an upper casing (not shown) and a lower casing (not shown) are assembled with the insulating plate 113 on which the wire 121 and the pressing contact terminals 120 have been mounted.

Figure 30:
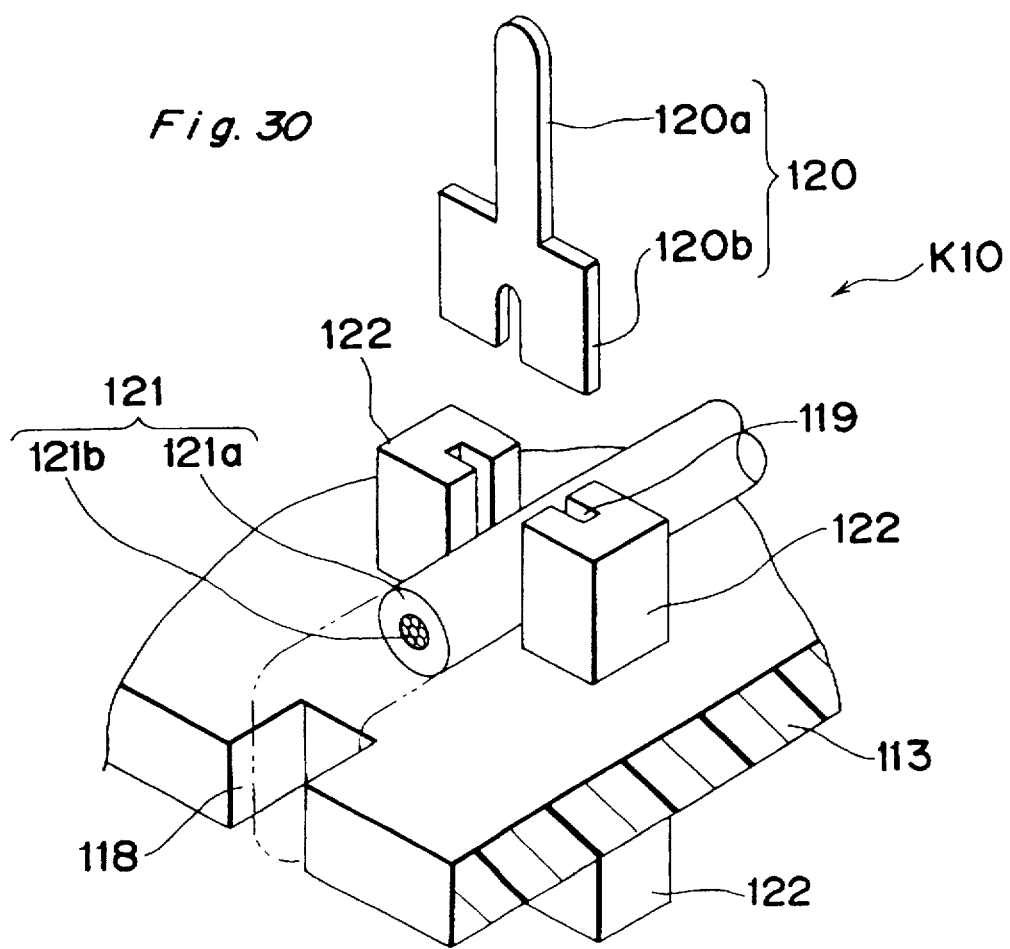
FIG. 30 is a fragmentary perspective view of an insulating plate of an electrical connection box having a wiring construction according to a tenth embodiment of the present invention.

In the ninth embodiment, the wiring grooves 117 formed on the upper and lower faces of the insulating plate 113 are used for guiding the wire 121. However, in a wiring construction K10 according to a tenth embodiment of the present invention, the wiring grooves 117 on the upper and lower faces of the insulating plate 113 are replaced by a plurality of pairs of wiring projections 122 as shown in FIG. 30. Meanwhile, it may also be so arranged that the wiring projections 122 are provided on one of the upper and lower faces of the insulating plate 113 and the wiring groove 117 is formed on the other of the upper and lower faces of the insulating plate 113.

If the wiring projections 122 are provided on one or both of the upper and lower faces of the insulating plate 113, thickness of the insulating plate 113 can be reduced in comparison with the ninth embodiment in which the wiring grooves 117 are formed on the upper and lower faces of the insulating plate 113, so that the electrical connection box can be made more compact and thinner. Especially, in case the wiring groove 117 is formed on the upper face of the insulating plate 113 and the wiring projections 122 are provided on the lower face of the insulating plate 113, the wire 121 can be directly inserted into the wiring groove 117 on the upper face of the insulating plate 113 from the wire feeder easily and stably, while the wire 121 turned down from the upper face of the insulating plate 113 can be laid between the wiring projections 122 on the lower face of the insulating plate 113 more easily than the wiring groove 117.

In the ninth and tenth embodiments, since wiring guides comprising the wiring grooves and/or the wiring projections are provided on the upper and lower faces of the insulating plate and a portion of the wire laid alone the wiring guide on the upper face of the insulating plate is turned down to the lower face of the insulating plate so as to be laid along the wiring guide on the lower face of the insulating plate, the wire can be laid on the upper and lower faces of insulating plate quite easily. Thus, since an internal circuit of the electrical connection box, which is formed by the wire and the pressing contact terminals, can be provided on the upper and lower faces of the insulating plate, complicated circuit sections and a number of circuit sections can be provided in the internal circuit without the need for increasing area of the insulating plate. Especially, in case the wire is laid along the wiring groove, the wire can be directly inserted into the wiring groove, a hitherto necessary wiring die is not required to be used, thereby resulting in reduction of production cost of the electrical connection box.

Meanwhile, if the vertical groove is formed on the side face of the insulating plate and the wire turned down form the upper face to the lower face of the insulating plate is passed through the vertical groove, the wire can be positioned and held positively. Furthermore, since the wire turned down to the lower face does not project from the side face of the insulating plate, wiring can be restricted within space of the insulating plate, so that area of the insulating plate can be Prevented and the wire can be protected from damage.

In addition, if the wire is continuously laid on the upper face of the insulating plate, the wire can be laid on the upper and lower faces of the insulating plate and thus, the wire may be supplied to the insulating plate from the wire feeder only once. Moreover, since the portions of the wire are preliminarily drawn outwardly from the insulating plate at the time of laying of the wire on the upper face of the insulating plate, wiring on the lower face can be performed easily by turning the outwardly drawn portions of the wire down to the lower face of the insulating plate. As a result, such an advantage can be gained that wiring can be performed rapidly and easily.

Figure 31:
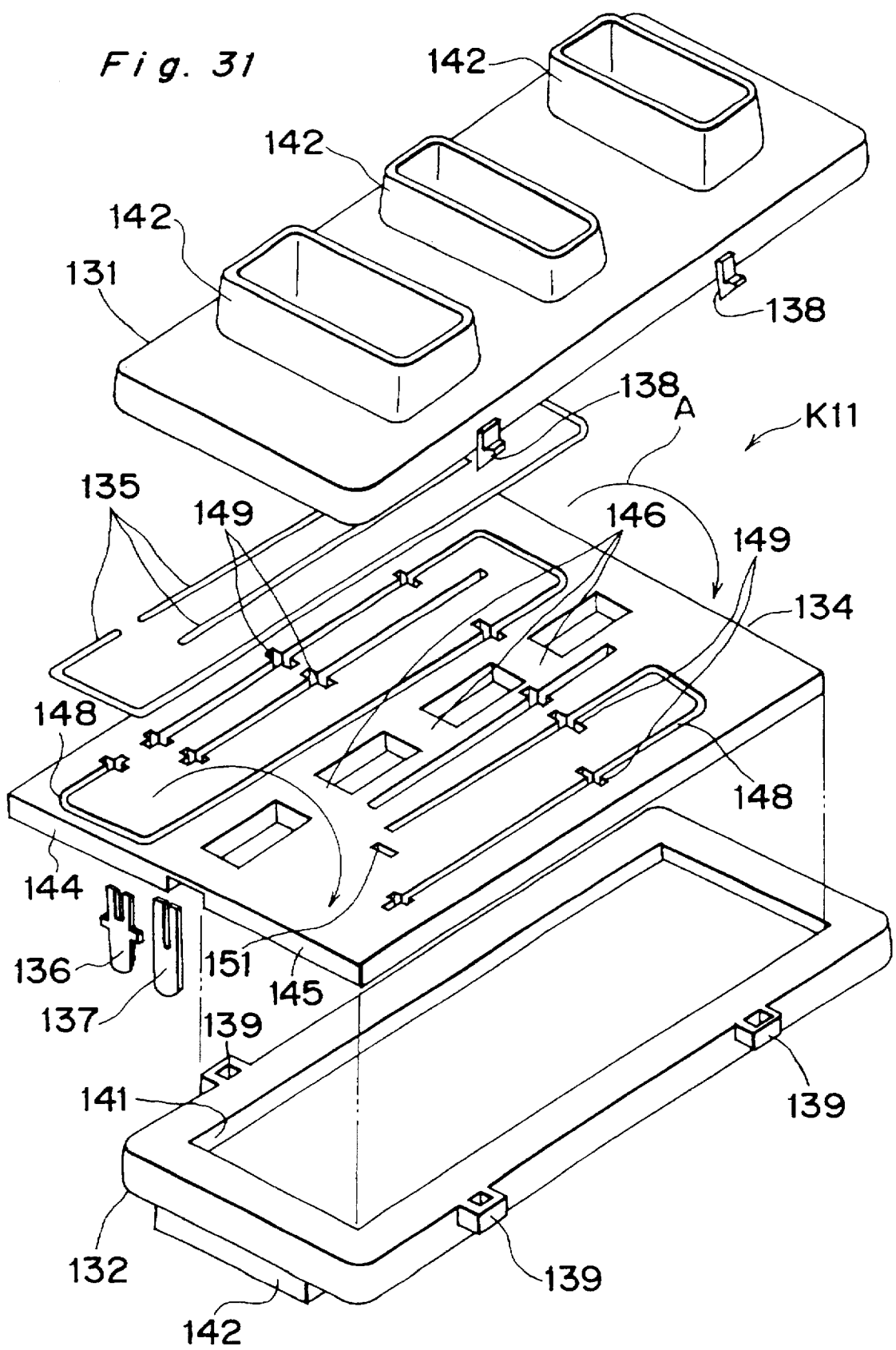
FIG. 31 is an exploded perspective view of an electrical connection box having a wiring construction according to an eleventh embodiment of the present invention; the electrical connection box of FIG. 31.
Figure 32:
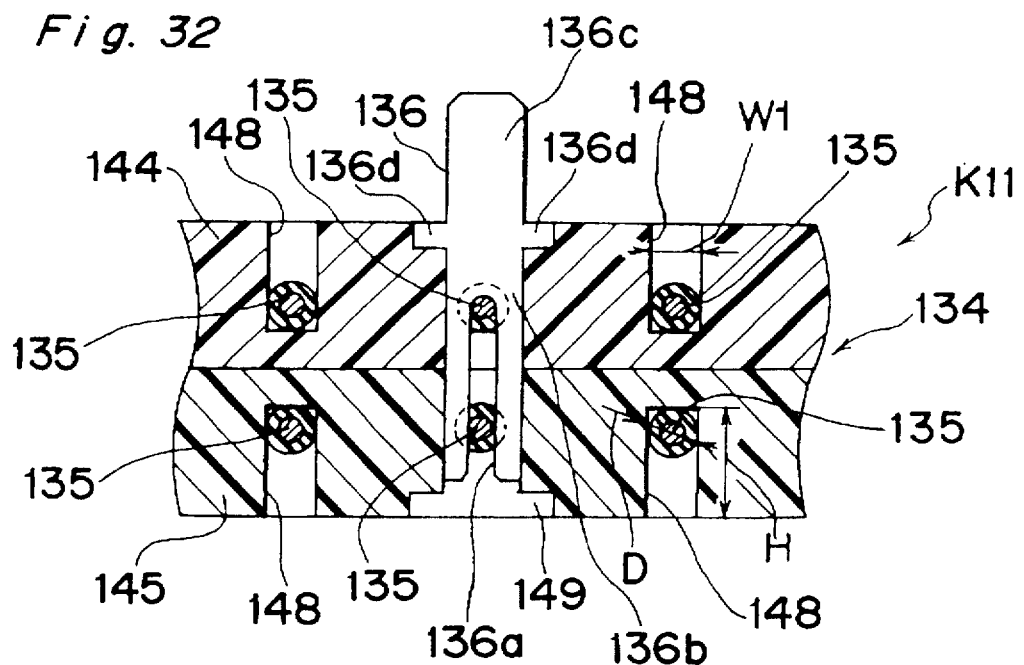
FIG. 32 is a fragmentary sectional view of an insulating plate, a pressing contact terminal and a wire of the electrical connection box of FIG. 31.
Figure 33:
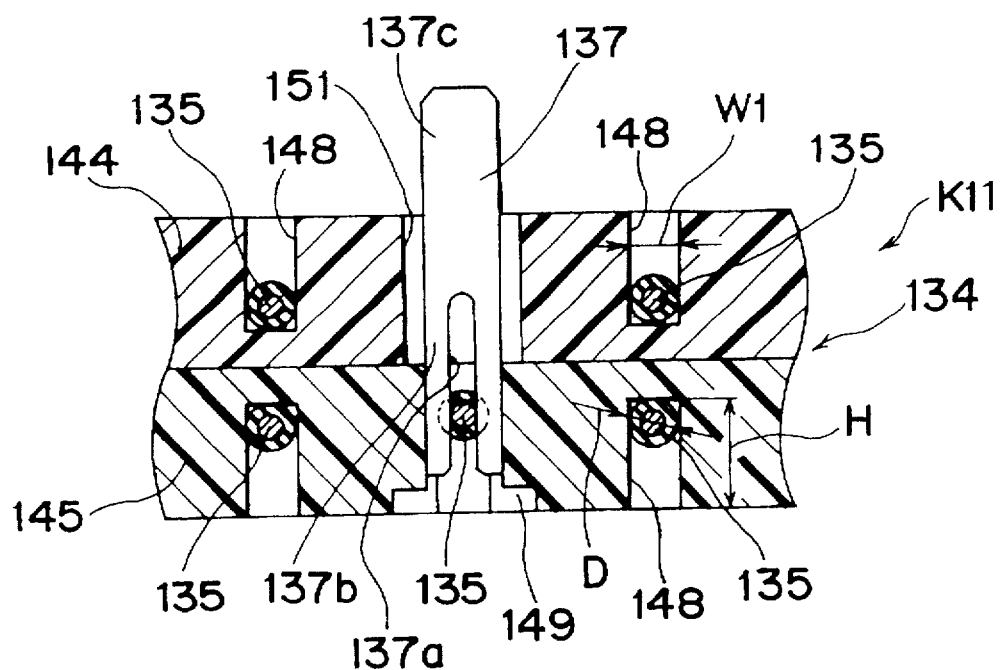
FIG. 33 is a fragmentary sectional view of the insulating plate, a pressing contact terminal and the wire of the electrical connection box of FIG. 31.

FIGS. 31 to 35 show an electrical connection box having a wiring construction K11 according to an eleventh embodiment of the present invention. As shown in FIGS. 31 to 33, the electrical connection box includes an upper casing 131, a lower casing 132, an insulating plate 134, wires 135 and pressing contact terminals 136 and 137. The upper and lower casings 131 and 132 are secured to each other through engagement of locking bosses 138 with locking pieces 139 so as to form a casing for the electrical connection box. A recess 141 for receiving the insulating plate 134 is formed one face of each of the upper and lower casings 131 and 132. Meanwhile, tubular connector portions 142 are provided on the other face of each of the upper and lower casings 131 and 132. Terminal holes (not shown) extending through each of the upper and lower casings 131 and 132 are formed in each of the connector portions 142 such that input-output terminal portions 136c and 137c of the pressing contact terminals 136 and 137 are projected into the connector portions 142 as will be described later.

The insulating plate 134 received in the recesses 141 of the upper and lower casings 131 and 132 is made of synthetic resin and includes two body portions 144 and 145 each having a flat platelike shape. Opposed sides of the body portions 144 and 145 are coupled with each other by hinges 146 as shown in FIG. 31 and then, the coupled body portions 144 and 145 are folded down at the hinges 146 as a fulcrum such that the body portion 144 is piled on the body portion 145 as shown in FIGS. 32 and 33. A wiring groove 148 is formed on one face of each of the body portions 144 and 145 such that the wiring groove 148 of the body portion 144 is aligned with that of the body portion 145 when the body portion 144 is piled on the body portion 145 as shown in FIGS. 32 and 33. Terminal driving portions 149 are formed at predetermined portions of the wiring groove 148. An internal circuit of the electrical connection box is formed by the wires 135 held in the wiring grooves 148 and the pressing contact terminals 136 and 137 driven into the terminal driving portions 149.

A width W1 of the wiring groove 148 is set so as to be slightly smaller than a diameter D of the wire 135 such that the wire 135 is held in the wiring groove 148 by press fitting the wire 148 into the wiring groove 148. Meanwhile, a depth H of the wiring groove 148 is set so as to be larger than the diameter D of the wire 135.

Figure 34:
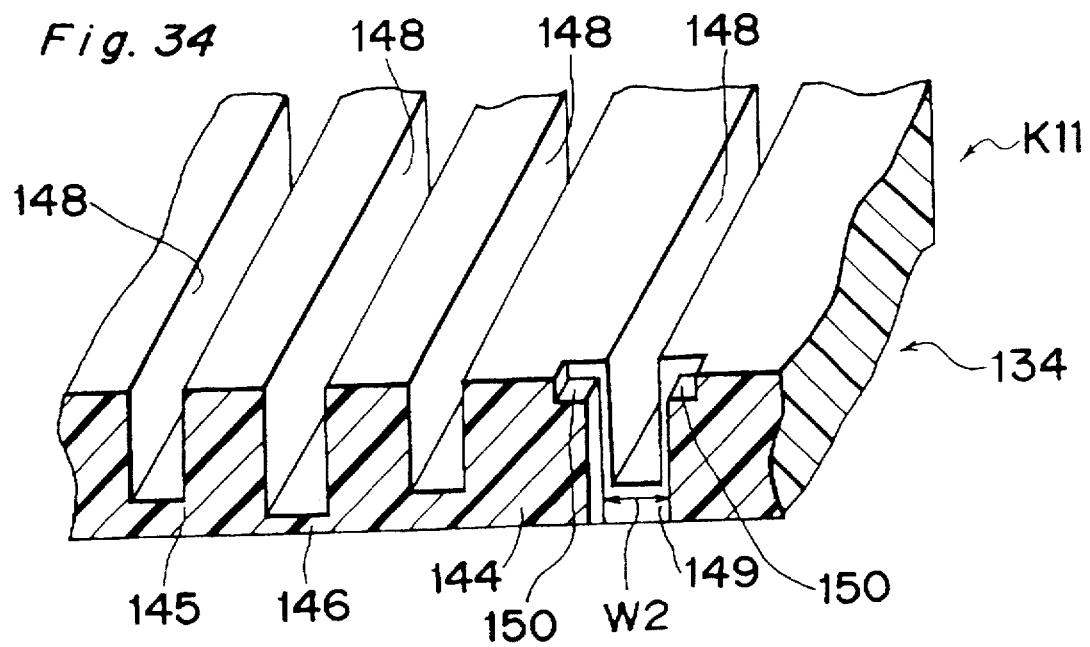
FIG. 34 is a partly sectional fragmentary perspective view of the insulating plate of FIG. 32.

As shown in detail in FIG. 34, a width W2 of the terminal driving portion 149 is set so as to be larger than the width W1 of the wiring groove 148 and the terminal driving portion 149 extends through the body portions 144 and 145 in a direction of their thickness. The width W2 of the terminal driving portion 149 is set so as to be slightly smaller than a width W3 of each of the pressing contact portions 136 and 137. When the body portions 144 and 145 are spread out as shown in FIG. 31, a pair of shoulder portions 150 are formed on upper faces of the body portions 144 and 145 at each of the terminal driving portions 149 by increasing width of each of the terminal driving portions 149. When the terminal driving portion 149 is provided at a location of the body portion 144 in a state where the body portion 144 is piled on the body portion 145 as shown in FIG. 32, the terminal driving portion 149 is provided also on the body portion 145 so as to be aligned with that of the body portion 144 such that the two terminal driving portions 149 extend through the body portions 144 and 145, respectively. One pressing contact terminal 136 is inserted into these two terminal driving portions 149 of the body portions 144 and 145 so as to be connected, through pressing contact, to the two wires 135 laid on the body portions 144 and 145.

As shown in FIG. 33, a through-holes 151 is formed on the body portion 144 in place of each of some of the wiring grooves 148 so as to be communicated with the terminal driving portion 149 of the body portion 145 in a state where the body portion 144 is piled on the body portion 145. In this case, the pressing contact terminal 137 can be inserted from the through-hole 151 portion of the body 144 into the terminal driving portion 149 of the body portion 145. Therefore, even if the pressing contact terminal 136 cannot be driven into the terminal driving portion 149 of the body portion 145 from the body portion 145, the pressing contact terminal 137 can be driven into the terminal driving portion 149 of the body portion 145 positively.

The hinge 146 for coupling the body portions 144 and 145 is formed by a thin member and is molded integrally with the body portions 144 and 145. As described above, the body portions 144 and 145 can be folded down at the hinges 146 as a fulcrum such that the body portion 144 is piled on the body portion 145.

Meanwhile, in this embodiment, the wiring grooves 148 are formed on one face of each of the body portions 144 and 145. However, by spreading out the body portions 144 and 145 as shown in FIG. 31 when the insulating plate 134 is used, the wiring grooves 148 may be formed on the opposite faces of each of the body portions 144 and 145. Furthermore, in this embodiment, the insulating plate 134 is formed by the two body portions 144 and 145 but may also be formed by three or more body portions.

A pressing contact portion 136b having a slit 136a is provided at one end of the pressing contact terminal 136, while the input-output terminal portion 136c is provided at the other end of the pressing contact terminal 136. Meanwhile, a pair of engageable portions 136d are provided at a base of the input-output terminal portion 136c. length of the slit 136a is set such that the pressing contact portion 136b can be connected to at least one wire 135 through pressing contact. Except for that the engageable portions 136d are not provided, the pressing contact terminal 137 to be inserted into the through-hole 151 is structurally identical with the pressing contact terminal 136.

In the electrical connection box of the above described arrangement, the body portions 144 and 145 having the wires 135 piled thereon, respectively are piled on each other and the two wires 135 laid on the body portions 144 and 145 can be connected to each other by the single pressing contact terminal 136. Therefore, even if the internal circuit is complicated, wiring can be simplified. For example, even in a case where it has been necessary to lengthen one wire extremely in a conventional electrical connection box, the wire can be divided into two wires and the two wires laid on the body portions 144 and 145 can be connected to each other by the single pressing contact terminal 136.

Figure 35:
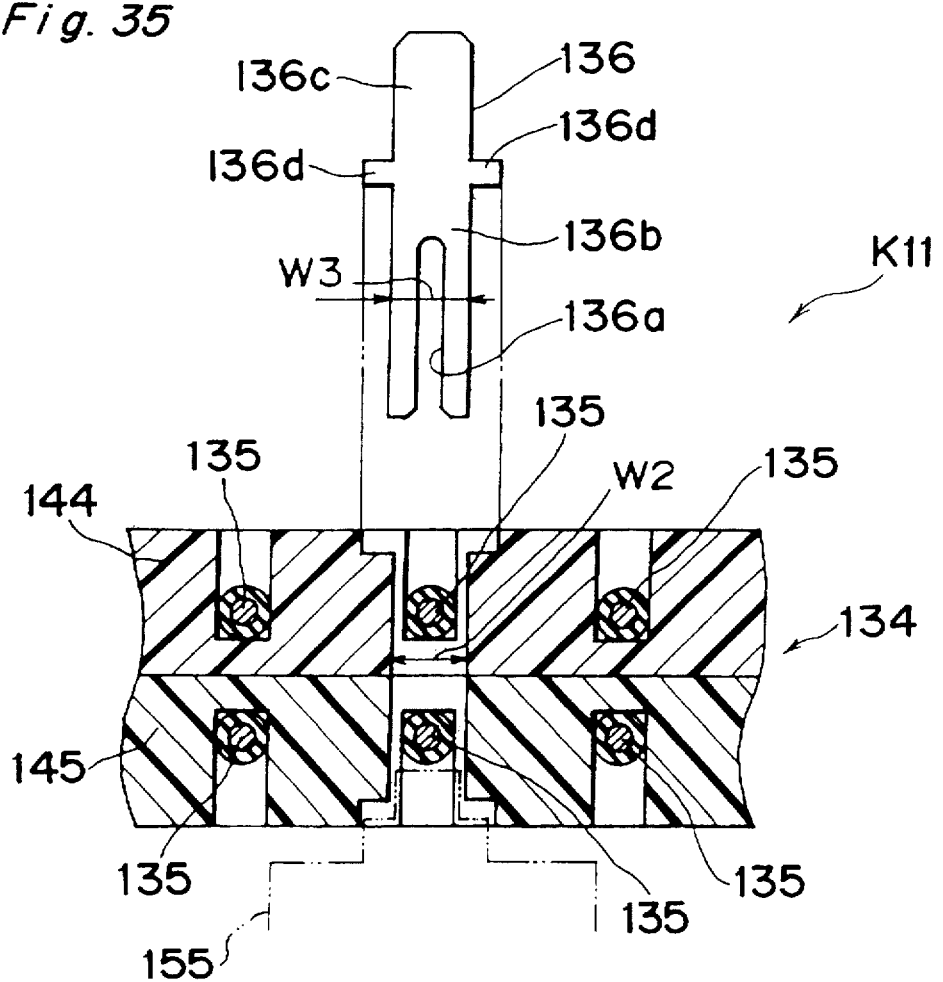
FIG. 35 is a partly sectional view explanatory of driving of the pressing contact terminal into the insulating plate of FIG. 32.
Figure 36:
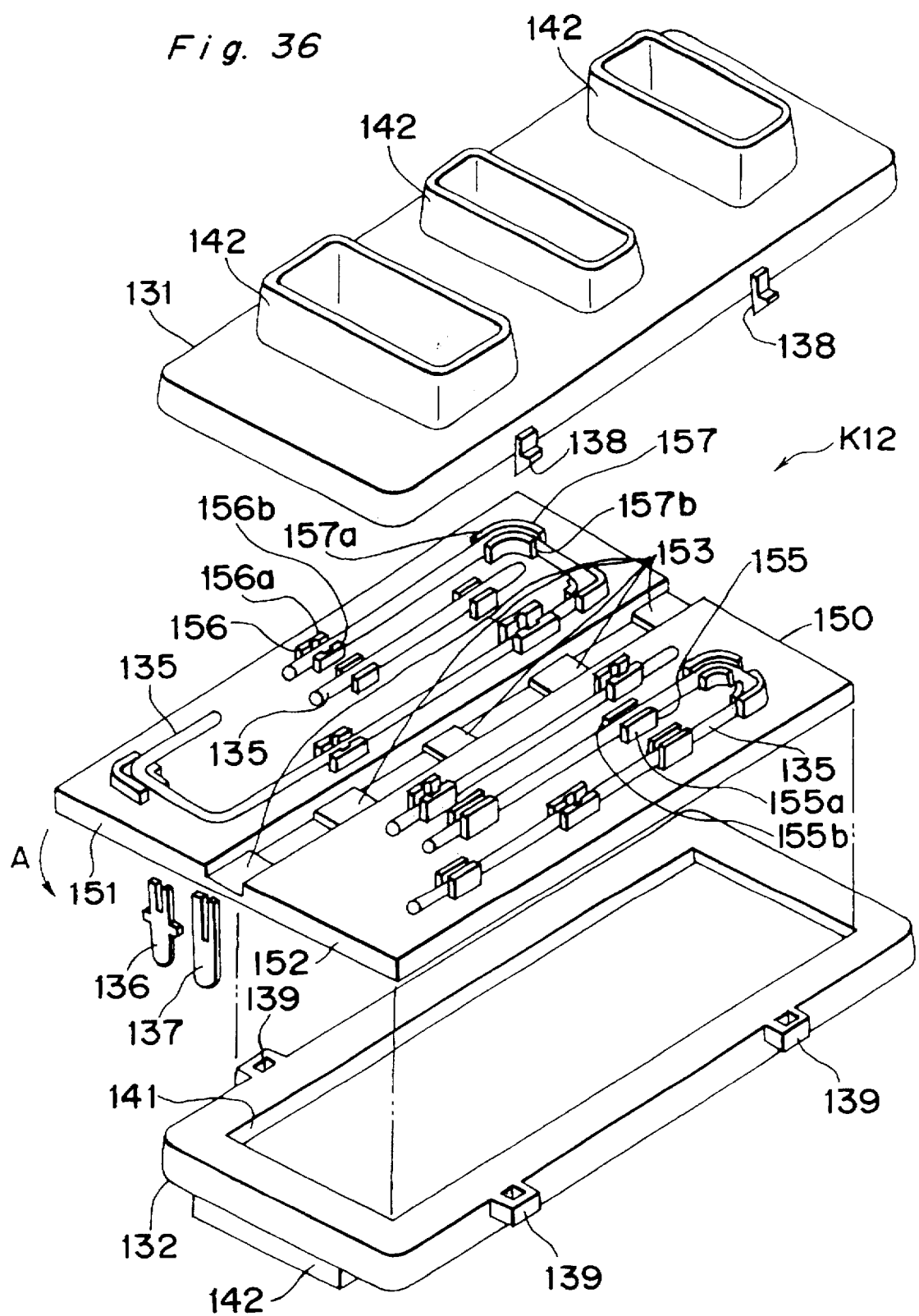
FIG. 36 is an exploded perspective view of an electrical connection box having a wiring construction according to a twelfth embodiment of the present invention.
Figure 37:
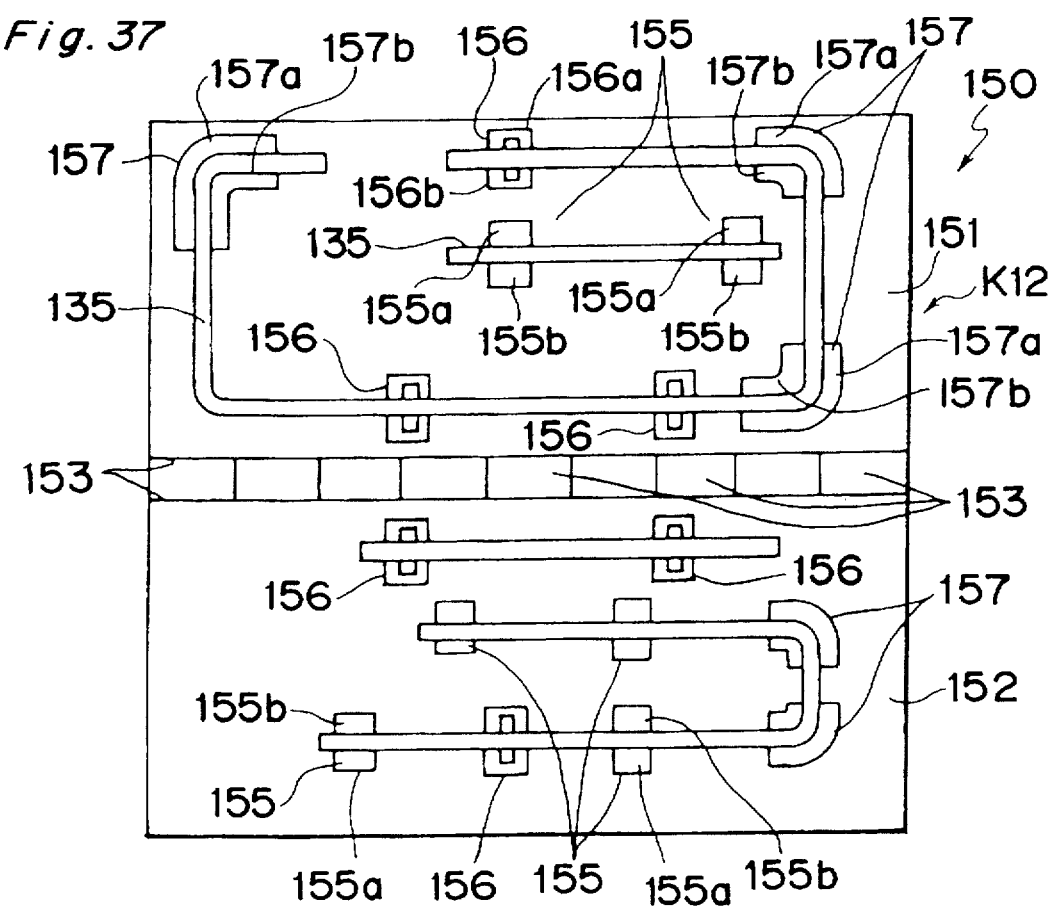
FIG. 37 is a top plan view of an insulating plate of the electrical connection box of FIG. 36.

Hereinafter, assembly of the electrical connection box of this embodiment is described. Initially, in a state where the hinges 146 are not bent, namely, the body portions 144 and 145 are spread out as shown in FIG. 31, the wires 135 are press fitted into the wiring grooves 148 of the body portions 144 and 145 by using a robot. Since the wiring grooves 148 are simple structurally and the pressing contact terminals 136 and 137 are not driven into the insulating plate 134 at this time, the wires 135 can be press fitted into the wiring grooves 148 positively and easily. Then, the pressing contact terminals 136 are press fitted into the terminal driving portions 149 such that the pressing contact portions 136b of the pressing contact terminals 136 are connected to the wires 135 held in the wiring grooves 148. At this time, by using a jig 155 as shown in FIG. 35, the wire 135 is prevented from being detached from the wiring groove 148 of the body portion 145 at the terminal driving portion 149.

Subsequently, the insulating plate 134 is folded down at the hinges 146 as shown by the arrow A in FIG. 31 such that the body portions 144 and 145 are piled on each other. At this time, assuming that one pressing contact terminal 136 has been press fitted into the terminal driving portion 149 of one of the body portions 144 and 145 so as to be connected to the wire 135 on the one of the body portions 144 and 145, the wire 135 on the other of the body portions 144 and 145 is connected to a distal end portion of the pressing contact portion 136b of the pressing contact terminal 136, so that the two wires 135 laid on the body portions 144 and 145, respectively are connected to the single pressing contact terminal 136. Meanwhile, the pressing contact terminal 137 shown in FIG. 33 is inserted into the through-hole 151 in this state in which the body portions 144 and 145 are piled on each other. Thereafter, the insulating plate 134 is received in the recess 141 of the lower casing 132 and then, the upper and lower casings 131 and 132 are assembled with each other.

In this state, the input-output terminal portions 136c and 137c of the pressing contact terminals 136 and 137 are projected into the connector portions 142 through the terminal holes of the upper and lower casings 131 and 132.

FIGS. 36 to 39 show an electrical connection box having a wiring construction K12 according a twelfth embodiment of the present invention. The electrical connection box includes an insulating plate 150. Since the electrical connection box of this embodiment is similar to that of the eleventh embodiment except for the insulating plate 150, only the insulating plate 150 is described for the sake of brevity, hereinafter. The insulating plate 150 includes two body portions 151 and 152 each having a flat platelike shape. Opposed sides of the body portions 151 and 152 are coupled with each other by hinges 153 each formed by a thin member and then, the body portions 151 and 152 are folded down at the hinges 153 as a fulcrum so as to be piled on each other. Wiring projections 155, 156 and 157 for guiding the wires 135 are provided on one face of each of the body portions 151 and 152. The wiring projection 155 includes a pair of wall portions 155a and 155b for gripping the wire 135 therebetween. Similarly, the wiring projections 156 and 157 include a pair of wall portions 156a and 156b and a pair of wall portions 157a and 157b, respectively.

Figure 38:
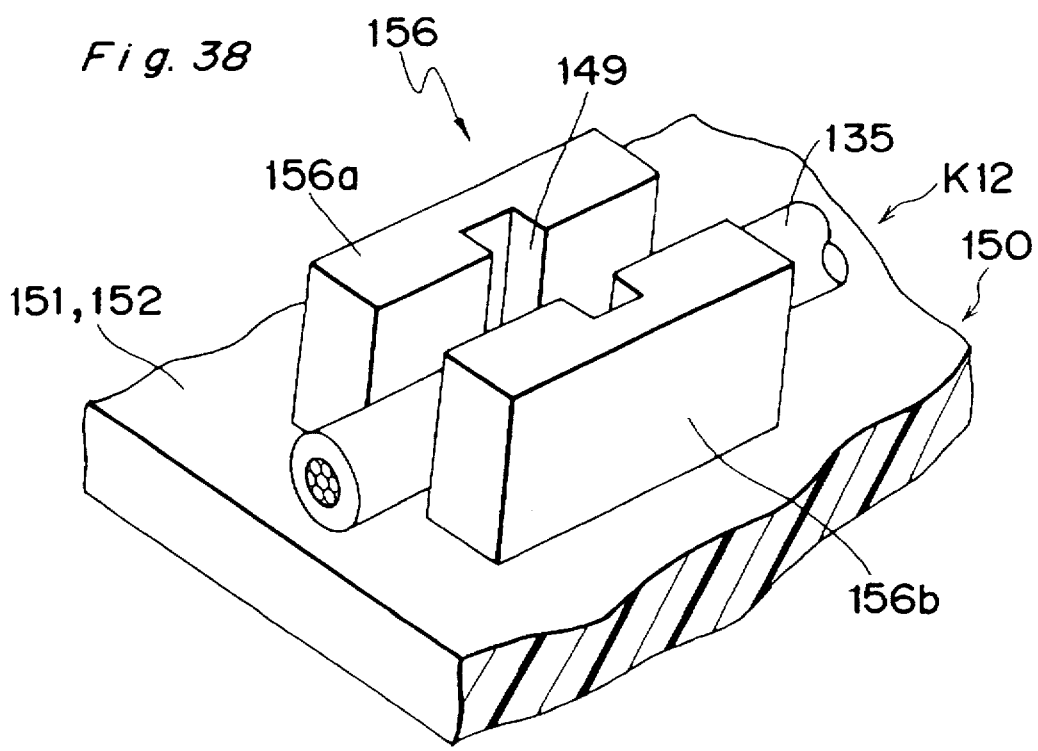
FIG. 38 is an enlarged fragmentary perspective view of the insulating plate of FIG. 37.
Figure 39:
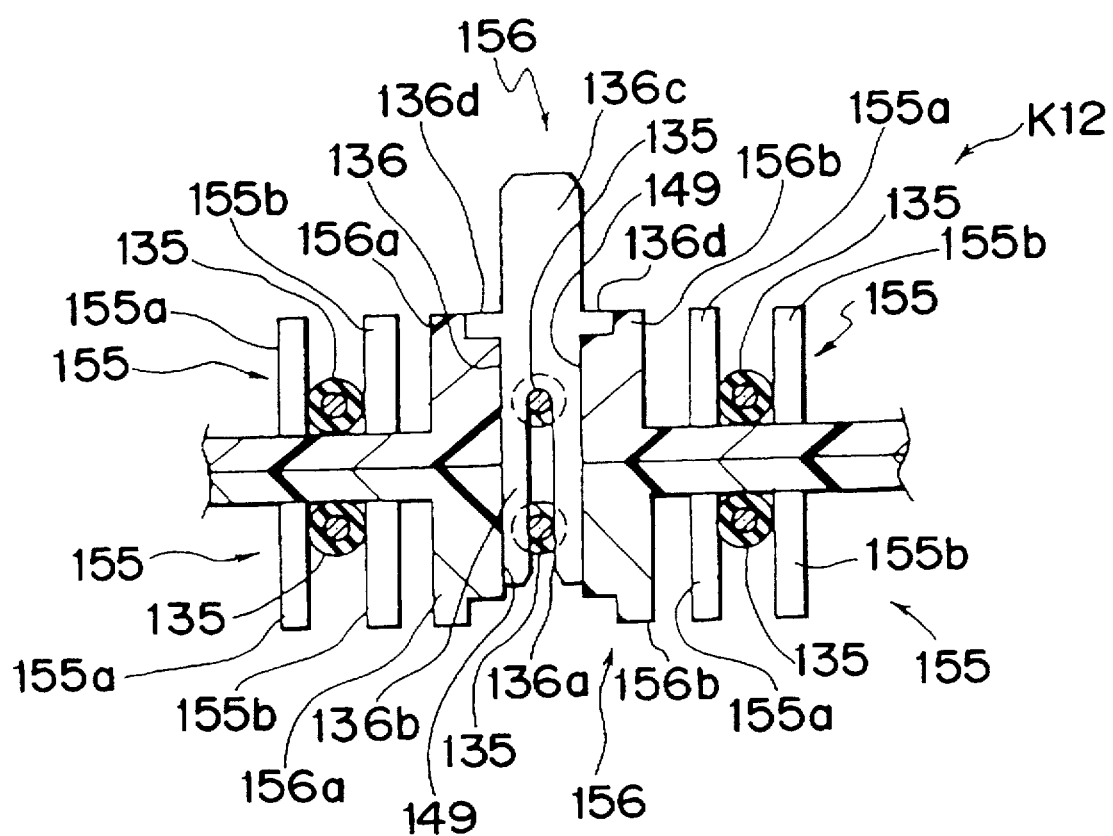
FIG. 39 is an enlarged fragmentary sectional view of the insulating plate of FIG. 37.

As shown in FIG. 38, only the wiring projection 156 has the terminal driving portion 149 extending through the body portions 151 and 152 in a direction of their thickness. As shown in FIG. 39, the pressing contact terminal 136 is driven into the terminal driving portion 149 so as to be connect the wires 135 on the body portions 151 and 152. Meanwhile, the wiring projections 157 are provided at locations of the insulating plate 150 for changing direction for laying the wire 135 and are curved so as to enable smooth bending of the wire 135.

When the wire is laid on the insulating plate 150 by the wiring projections 155, 156 and 157, thickness of the insulating plate 150 can be reduced and thus, the insulating plate 150 can be made lighter and more compact.

Accordingly, in the insulating plate of the eleventh and twelfth embodiments, the wiring grooves for receiving the wires or the wiring projections for guiding the wires are provided on a plurality of the body portions of the insulating plate and the terminal driving portions are formed at the wiring grooves or the wiring projections, while the opposed sides of the body portions are coupled with each other by the hinges and the body portions are folded down at the hinges so as to be piled on each other such that the folded body portions are accommodated in the casing. Therefore, even in case a complicated internal circuit of the electrical connection box is formulated, wiring can be simplified. Especially, even when an optional circuit is required to be provided according to grade of motor vehicles or a circuit section of the internal circuit, which is not used in common in the case where the internal circuit is used for motor vehicles of different types in common, is used as an optional circuit, wiring is simplified and thus, can be performed efficiently.

Meanwhile, when the body portions of the insulating plate have been piled on each other, the terminal driving portions of the body portions are aligned with each other so as to be communicated with each other. Therefore, by inserting a single pressing contact terminal into the terminal driving portions communicated with each other, the pressing contact terminal can be connected to a plurality of the wires through pressing contact and thus, wiring can be simplified. In this case, since the pressing contact terminal can be driven into the terminal driving portions is from the opposite face of the insulating plate, the connector portions can be provided on both the upper portion and the lower portion of the casing.

Furthermore, when the body portions of the insulating plate have been piled on each other, the through-hole formed on one of the body portions is aligned with the terminal driving portion provided on the other of the body portions so as to be communicated with the terminal driving portion. Therefore, the pressing contact terminal can be inserted into the terminal driving portion from the through-hole. Accordingly, even in case the pressing contact terminal cannot be driven into the terminal driving portion from the other of the body portions, the pressing contact terminal can be positively driven into the terminal driving portion from the one of the body portions.

Moreover, since the hinges are each formed by a thin member and are molded integrally with the body portions, the body portions can be piled on each other easily.

In addition, the insulating plate is formed by a plurality of the body portions each having a flat plate-like shape and the body portions are coupled with each other by the hinges so as to be piled on each other such that the insulating plate is accommodated in the casing. The wiring grooves for receiving the wires or the wiring projections for guiding the wires are provided on the body portions of the insulating plate and the terminal driving portions are formed at the wiring grooves or the wiring projections. Therefore, even if a complicated internal circuit of the electrical connection box is formulated, wiring can be simplified.

What is claimed is:

1. A wiring method of an electrical connection box in which a plurality of wiring grooves for receiving a wire or a plurality of pairs of wiring projections for guiding the wire therebetween are provided on opposite faces of an insulating plate in accordance with predetermined wiring patterns and are formed with a plurality of terminal driving portions for receiving pressing contact terminals, respectively, the wiring method comprising the steps of:

providing the insulating plate;

laying the wire continuously along the wiring grooves or the wiring projections on one of the opposite faces of the insulating plate such that a portion of the wire extends outwardly from an outer peripheral edge of the insulating plate;

turning down the portion of the wire to the other of the opposite faces of the insulating plate along the outer peripheral edge of the insulating plate;

laying the portion of the wire along the wiring grooves or the wiring projections on the other of the opposite faces of the insulating plate; and driving the pressing contact terminals into the terminal driving portions, respectively so as to connect, through pressing contact, the pressing contact terminals to the wire laid on the opposite faces of the insulating plate.

\* \* \* \* \*